(12) United States Patent
Smith et al.

(10) Patent No.: US 10,824,813 B2
(45) Date of Patent: *Nov. 3, 2020

(54) PIVOTING FROM A GRAPH OF SEMANTIC SIMILARITY OF DOCUMENTS TO A DERIVATIVE GRAPH OF RELATIONSHIPS BETWEEN ENTITIES MENTIONED IN THE DOCUMENTS

(71) Applicant: Quid, Inc., San Francisco, CA (US)

(72) Inventors: David Smith, San Francisco, CA (US); Ruggero Altair Tacchi, San Francisco, CA (US)

(73) Assignee: Quid Inc., San Francisco, CA (US)

( * ) Notice: Subject to any disclaimer, the term of this patent is extended or adjusted under 35 U.S.C. 154(b) by 397 days.

This patent is subject to a terminal disclaimer.

(21) Appl. No.: 15/619,734

(22) Filed: Jun. 12, 2017

(65) Prior Publication Data
US 2017/0337262 A1 Nov. 23, 2017

Related U.S. Application Data

(63) Continuation of application No. 15/159,059, filed on May 19, 2016, now Pat. No. 9,710,544.

(51) Int. Cl.
*G06F 16/36* (2019.01)
*G06F 40/30* (2020.01)

(52) U.S. Cl.
CPC ............ *G06F 40/30* (2020.01); *G06F 16/36* (2019.01)

(58) Field of Classification Search
CPC .... G06T 11/206; G06F 16/36; G06F 17/2785; G06F 17/30675; G06F 17/28; G06F 11/206; G06F 17/30958; G06F 17/30011; G06F 16/288; G06F 16/5854
USPC ............... 707/798, 723, 726, 728, 739, 749
See application file for complete search history.

(56) References Cited

U.S. PATENT DOCUMENTS

| | | | | |
|---|---|---|---|---|
| 5,546,517 A | * | 8/1996 | Marks | G06F 16/94 715/206 |
| 6,154,213 A | * | 11/2000 | Rennison | G06F 16/34 715/854 |
| 6,321,220 B1 | * | 11/2001 | Dean | G06F 16/951 707/726 |
| 6,523,026 B1 | * | 2/2003 | Gillis | G06F 16/3332 |
| 6,542,886 B1 | * | 4/2003 | Chaudhuri | G06F 16/2462 |

(Continued)

*Primary Examiner* — Mohammed R Uddin
(74) *Attorney, Agent, or Firm* — Pillsbury Winthrop Shaw Pittman, LLP

(57) ABSTRACT

Provided is a process including: sampling of nodes of a first graph; and forming a second graph comprising nodes, each of which corresponds to at least one entity mentioned in unstructured text documents. Forming the second graph comprises, for each pair of the nodes of the second graph, setting a relationship between the pair, the pair comprising (i) a first node corresponding to a first entity and (ii) a second node corresponding to a second entity, by: identifying, in the first graph, a node corresponding to an unstructured text document in which the first entity is mentioned; and setting the relationship between the pair based on a determination of whether or which of the sampled nodes comprises a node satisfying a set of criteria, the criteria comprising (i) having a relationship with the identified node and (ii) corresponding to an unstructured text document in which the second entity is mentioned.

20 Claims, 5 Drawing Sheets

(56) References Cited

U.S. PATENT DOCUMENTS

| | | | | |
|---|---|---|---|---|
| 6,662,357 B1* | 12/2003 | Bowman-Amuah | G06F 8/20 | 717/120 |
| 8,356,035 B1* | 1/2013 | Baluja | G06F 16/583 | 707/741 |
| 8,446,842 B2* | 5/2013 | Cao | G06F 16/9024 | 370/254 |
| 8,736,612 B1* | 5/2014 | Goldman | G06Q 50/01 | 345/440 |
| 8,949,233 B2* | 2/2015 | Hsiao | G06N 5/022 | 707/735 |
| 9,436,760 B1* | 9/2016 | Tacchi | G06F 16/367 | |
| 2003/0182310 A1* | 9/2003 | Charnock | G06Q 10/10 | |
| 2004/0162834 A1* | 8/2004 | Aono | G06F 16/3344 | |
| 2006/0136403 A1* | 6/2006 | Koo | G06F 19/324 | |
| 2007/0124291 A1* | 5/2007 | Hassan | G06F 16/34 | |
| 2008/0301094 A1* | 12/2008 | Zhu | G06F 16/951 | |
| 2009/0043797 A1* | 2/2009 | Dorie | G06F 16/355 | |
| 2010/0063973 A1* | 3/2010 | Cao | G06F 16/9024 | 707/758 |
| 2010/0169354 A1* | 7/2010 | Baby | G06F 16/81 | 707/765 |
| 2010/0318537 A1* | 12/2010 | Surendran | G06F 16/36 | 707/759 |
| 2011/0040776 A1* | 2/2011 | Najm | G06F 16/3326 | 707/766 |
| 2011/0295589 A1* | 12/2011 | Brockett | G06F 17/2775 | 704/4 |
| 2011/0320411 A1* | 12/2011 | Henderson | G06F 16/27 | 707/687 |
| 2012/0041683 A1* | 2/2012 | Vaske | G16B 5/00 | 702/19 |
| 2012/0079372 A1* | 3/2012 | Kandekar | G06F 17/2745 | 715/256 |
| 2012/0096042 A1* | 4/2012 | Brockett | G06F 16/24534 | 707/798 |
| 2012/0174006 A1* | 7/2012 | Brownell | G06Q 50/01 | 715/764 |
| 2012/0197834 A1* | 8/2012 | Panigrahy | G06N 5/048 | 706/52 |
| 2012/0317088 A1* | 12/2012 | Pantel | G06F 16/972 | 707/706 |
| 2012/0331402 A1* | 12/2012 | Hon | G06F 16/44 | 715/756 |
| 2013/0066823 A1* | 3/2013 | Sweeney | G06N 5/02 | 706/50 |
| 2013/0204876 A1* | 8/2013 | Szucs | G06F 16/94 | 707/738 |
| 2013/0246315 A1* | 9/2013 | Joshi | G06N 5/04 | 706/10 |
| 2013/0346421 A1* | 12/2013 | Wang | G06F 16/3346 | 707/748 |
| 2014/0188862 A1* | 7/2014 | Campbell | G06Q 50/01 | 707/728 |
| 2014/0229163 A1* | 8/2014 | Gliozzo | G06F 17/2785 | 704/9 |
| 2014/0317038 A1* | 10/2014 | Mojsilovic | G06Q 10/00 | 706/46 |
| 2015/0169758 A1* | 6/2015 | Assom | G06F 16/36 | 707/603 |
| 2015/0213644 A1* | 7/2015 | Cha | G06T 17/10 | 345/420 |
| 2015/0242387 A1* | 8/2015 | Rachevsky | G10L 15/06 | 704/9 |
| 2015/0262078 A1* | 9/2015 | Sarikaya | G06N 20/00 | 706/12 |
| 2015/0340024 A1* | 11/2015 | Schogol | G10L 15/26 | 704/235 |
| 2016/0071035 A1* | 3/2016 | Chee | G06Q 10/0635 | 705/7.28 |
| 2016/0092448 A1* | 3/2016 | Byron | G06F 16/3344 | 707/739 |
| 2016/0253679 A1* | 9/2016 | Venkatraman | G06Q 30/0185 | 705/310 |
| 2016/0321357 A1* | 11/2016 | Novacek | G06F 16/35 | |

* cited by examiner

US 10,824,813 B2

PIVOTING FROM A GRAPH OF SEMANTIC SIMILARITY OF DOCUMENTS TO A DERIVATIVE GRAPH OF RELATIONSHIPS BETWEEN ENTITIES MENTIONED IN THE DOCUMENTS

CROSS-REFERENCE TO RELATED APPLICATIONS

The present patent is a continuation of U.S. patent application Ser. No. 15/159,059, filed 19 May 2016, having the same title, the entire content of which is hereby incorporated by reference.

BACKGROUND

1. Field

The present invention relates generally to derivative graphs and, more specifically, to pivoting from a graph of semantic similarity of documents to a derivative graph of relationships between entities mentioned in the documents or other features (e.g., other features of unstructured text in the documents).

2. Description of the Related Art

Often people wish to draw inferences based on information contained in, and distributed among, relatively large collections of documents, e.g., substantially more documents than they have time to read or the cognitive capacity to analyze. Certain types of inferences implicate relationships between those documents. For example, it may be useful to organize documents by the subject matter described in the documents, sentiments expressed in the documents, or topics addressed in the documents. In many cases, useful insights can be derived from such organization, for example, discovering taxonomies, ontologies, relationships, or trends that emerge from the analysis. Examples might include organizing restaurants based on restaurant reviews, organizing companies based on content in company websites, organizing current events or public figures based on new stories, and organizing movies based on dialogue.

One family of techniques for making such inferences is computational linguistic analysis of text, such as unstructured text, within the documents of a corpus, e.g., with natural language processing techniques, like those based on distributional semantics. Computers are often used to perform semantic similarity analyses within corpora to gauge document pair-wise similarity of the documents according to various metrics, or pair-wise measures of relationships between entities, topics, terms, or sentiments discussed in the documents, which may be crafted to yield results like those described above. Through the sophisticated use of computers, inferences that would otherwise be impractical are potentially attainable, even on relatively large collections of documents.

In some cases, a graph may represent relationships between documents in a collection (e.g., one or more corpora), entities mentioned in the documents, or other features of the documents. The nodes of the graph may represent such documents, entities, or other features, where an edge between two nodes of the graph may denote semantic similarity between respective documents, entities, or other features represented by those two nodes. Typically, such a graph may be used to obtain discrete similarity measurements with respect to the represented documents, entities, or other features. In some cases, however, typical methods fail to reveal other similarities between attributes of the represented documents, entities, or other features (or other information that may not be explicitly indicated by the graph).

SUMMARY

The following is a non-exhaustive listing of some aspects of the present techniques. These and other aspects are described in the following disclosure.

Some aspects include a process including: obtaining a first graph comprising nodes and edges, each of the first-graph edges linking two of the first-graph nodes and denoting semantic similarity of unstructured text in documents corresponding to the two linked first-graph nodes; for each of the first-graph nodes, selecting one or more nodes for a second graph from attributes of the unstructured text documents to which the first-graph node corresponds, wherein the attributes are entities mentioned in the unstructured text documents or other features of the unstructured text document, and wherein each of the second-graph nodes corresponds to a respective selected attribute; and for each pair of the second-graph nodes, determining a respective edge weight indicating similarity between a first entity corresponding to a first node of the respective pair and a second entity corresponding to a second node of the respective pair, wherein determining the respective edge weight comprises: determining a source node of the first graph from which the first entity was selected; sampling a node of the first graph from one or more nodes proximate the source node; determining that the sampled proximate node of the first graph is a destination node from which the second entity was selected and, based on the determination, determining an attribute-similarity value indicating an amount of similarity between the first entity and the second entity; and determining the respective edge weight based on the attribute-similarity value.

Some aspects include a tangible, non-transitory, machine-readable medium storing instructions that when executed by a data processing apparatus cause the data processing apparatus to perform operations of the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
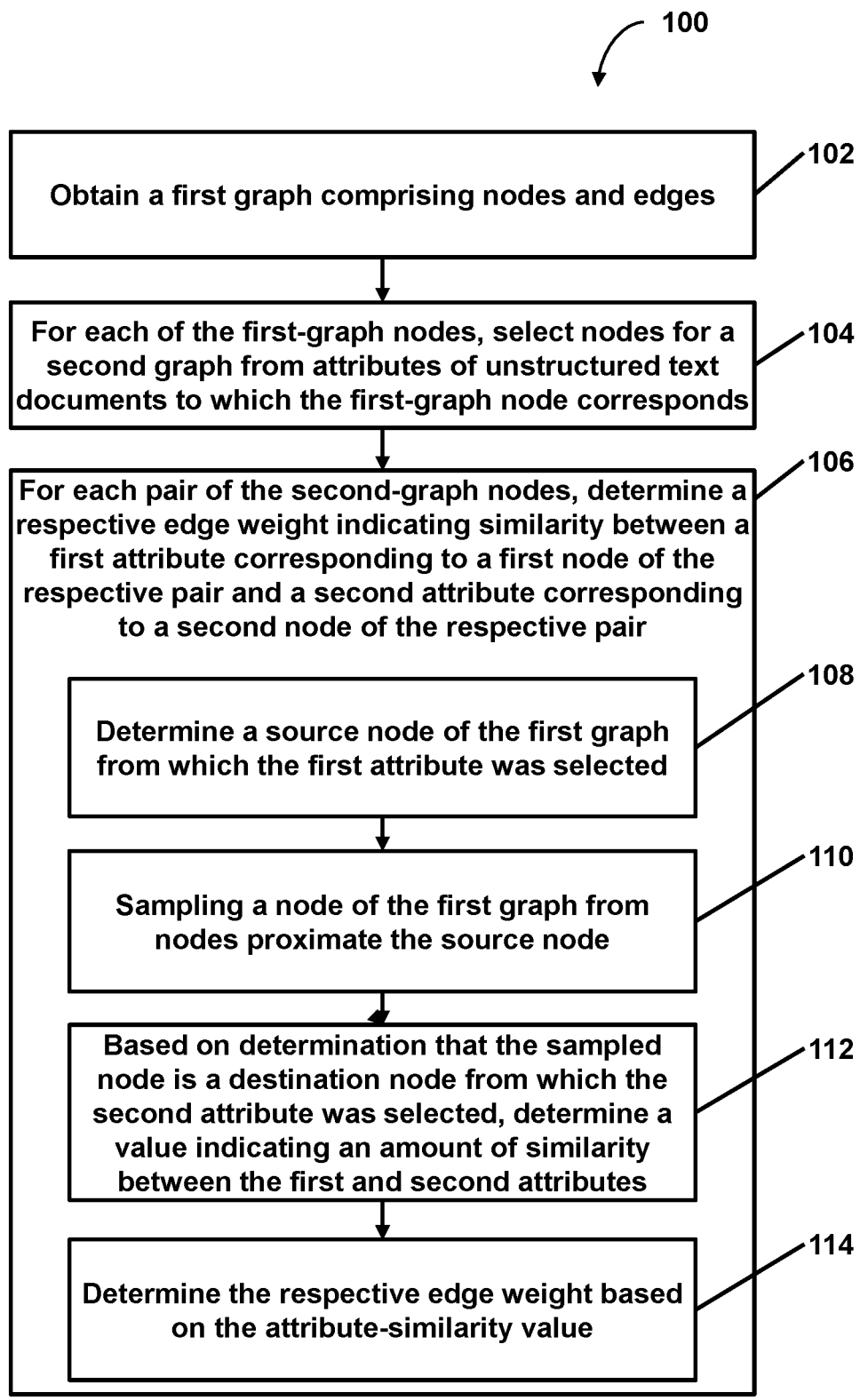
FIGS. 1-3 are flow charts of examples of processes of facilitating derivative graph generation.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims. As used in the specification and in the claims, the singular form of "a", "an", and "the" include plural referents unless the context clearly dictates otherwise. In addition, as used in the specification and the claims, the term "or" means "and/or" unless the context clearly dictates otherwise.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of natural language processing and computational linguistics. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

In some cases, computational linguistic analysis of a collection of documents (or other analyzed corpus) may yield a semantic graph (or other type of graph, like those described below), where nodes represent documents, entities mentioned in the documents, or other features of the documents, and edges (e.g., weighted or unweighted, directed or undirected, depending on the use case) are given by pairwise relationships between each couple of documents, mentioned entities, or other features of the documents. Using the graph, discrete measurements (e.g., discrete similarity measurements) may be obtained by relying on the edges shared between nodes as explicit indications of similarities or other relationships between respective represented documents, entities, or other features. Typical analysis or results therefrom may, however, fail to uncover information such as the similarities between attributes of the represented documents, entities, or other features (or other information that may not be explicitly indicated by the graph).

To mitigate these problems (or subsets thereof, depending on design tradeoffs), or other problems discussed below, some embodiments generate a derivative graph (or multiple derivative graphs) from the original semantic graph, including determining respective edge weights for the derivative graph edges that indicate respective amounts of similarity between attributes of the original graph nodes, where nodes of the generated derivative graph represent or otherwise correspond to the attributes of the original graph nodes. In some cases, one or more sampling techniques may be utilized to generate the derivative graph (or multiple derivative graphs) to render such graph generation computationally feasible (e.g., where the original graph or number of attributes analyzed in graph derivation is large), as described herein. In some cases, such derivative graphs may provide many potential derivative insights that may not have been possible or efficiently obtainable via the original graph, including, for example, insights into the similarities or other relationships between pairs of attributes of the original graph nodes (or its represented documents, entities, or other features) whose pairwise relationships may already be known or explicitly indicated via the original graph.

For example, some embodiments may obtain a graph of semantic similarity of documents in a corpus (e.g., Associated Press news articles over a trailing duration of several years). From this, some embodiments may derive a graph of relationships between entities (like people or businesses) mentioned in the documents. The resulting graph is expected to reveal relationships between the entities, which is expected to be different from relationships between documents mentioning the entities. The same entity may be mentioned in semantically dissimilar documents, and certain entities may tend to co-occur with a high frequency in similar documents. As a result, the derived graph is expected to reveal new insights. Links in the derived graph may be clustered to generate an ontology of the entities, where the classes of the ontology are unknown prior to the analysis.

Further, some embodiments may derive graphs in a fashion that improves upon the operation of a computer system relative to more naive ways of structuring the analysis. Commercially relevant corpora tend to be relatively large and yield relatively large similarity graphs. Further, each document often has a relatively large number of attributes (like the aforementioned entities, such as people or businesses mentioned in the document). As a result, the number of pairwise relationships between such attributes scales poorly, both in memory complexity and time complexity. Some embodiments may render otherwise computationally intractable problems feasible with a probabilistic determination of attribute relationships.

Figure 2:
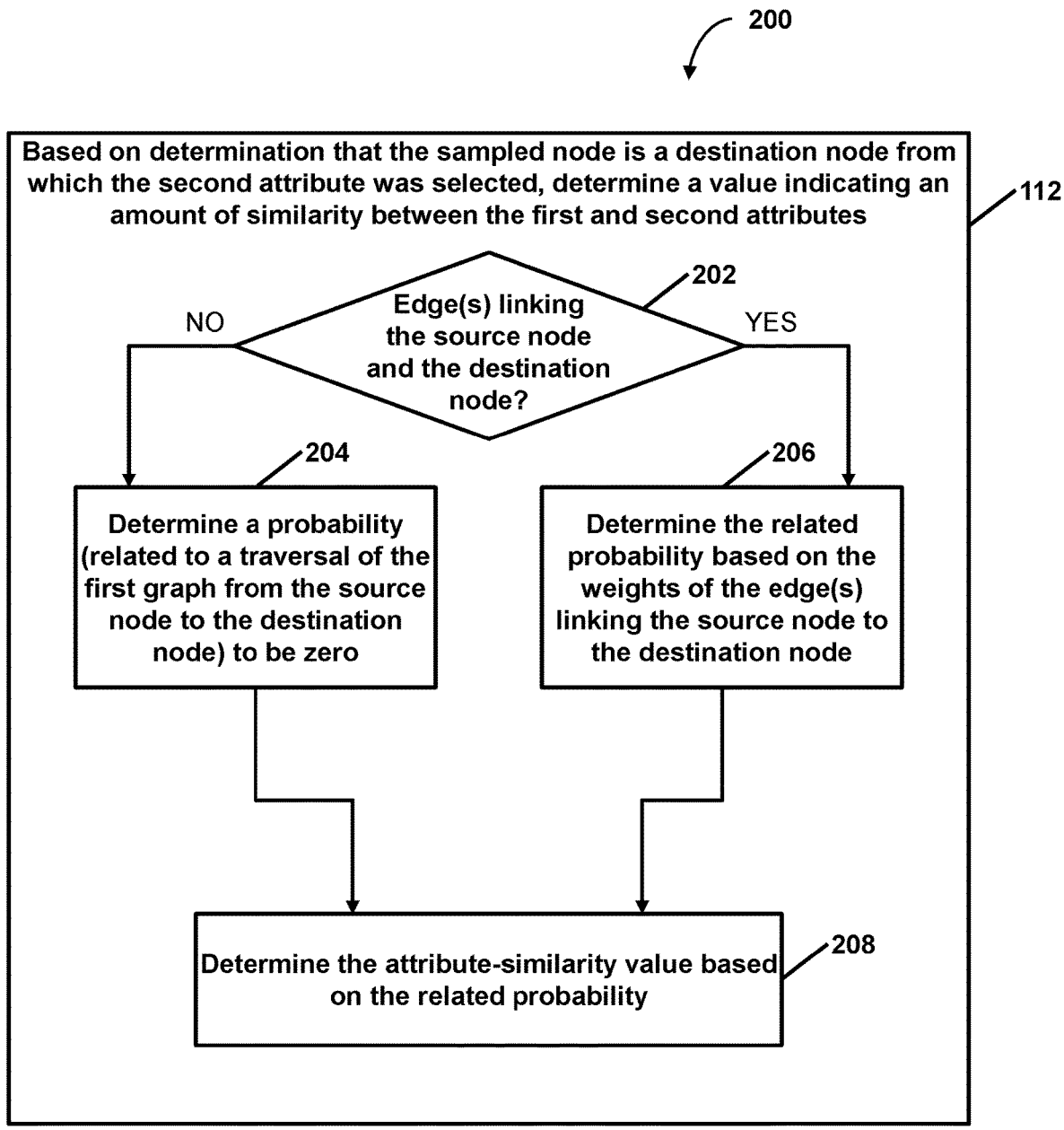
Figure 3:
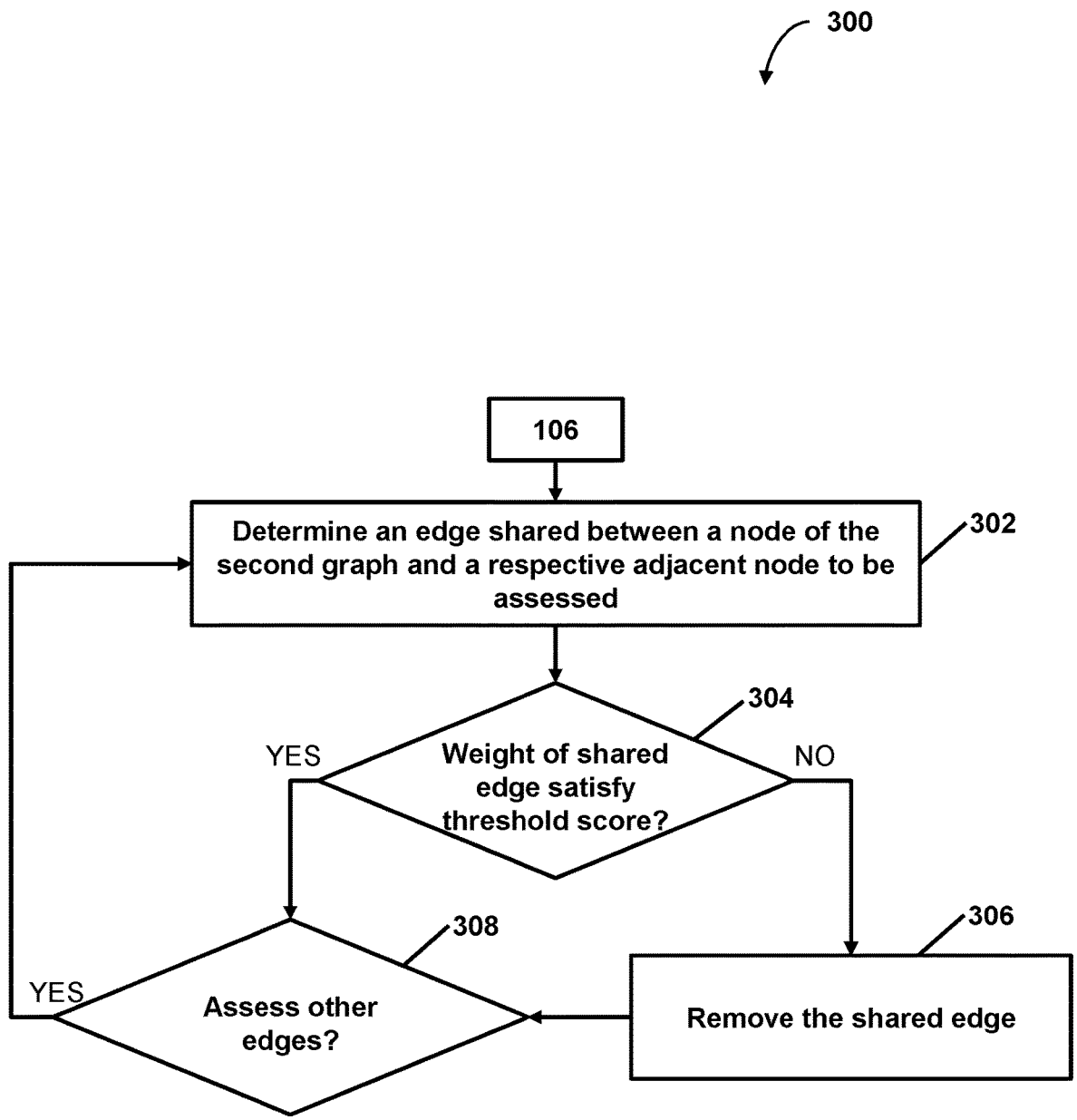

FIGS. 1-3 illustrate examples of processes 100, 200, and 300 configured to derive a graph from an input document graph. In many likely commercially relevant use cases, the processes 100, 200, or 300 may tax the limits of the computational resources available. The process of generating a derivative graph, and other use cases, is often constrained by time and computing resources available. For example, some embodiments may perform the analyses described herein within less than 24 hours, for example, within less than five hours, like within less than one hour, and in some cases in real-time (e.g., within less than 30 seconds following a user request, and in some cases, within well less than 5 seconds) using, for example, less than 1 Tflops (or floating point operations per second), 500 Gflops, or 100 Gflops of computing power to service the requested analysis. In some cases, a single computing device (or virtual machine having a distinct operating system instance or a container instance) may implement the processes 100, 200, or 300, or some embodiments may be implemented in a distributed fashion, with a plurality of computing systems operating in a networked environment, like a data center. Examples of such computing systems are described below with reference to FIG. 5.

In some embodiments, the processes 100, 200, or 300 include obtaining data upon which the processes 100, 200, or 300 operate, e.g., a graph, or corpora from which a graph is formed. In some cases, the processes 100, 200, or 300 take as an input a graph in the form of a list of edges, adjacency matrix, or other format (which is not to imply that matrix may not be encoded as list of edges). Some embodiments may also ingest the content of each document as plain text, or other forms of input may be obtained as described below, e.g., with reference to FIG. 4. To perform text quantitative analysis, some embodiments may covert such text into text vector representations (like feature vectors), e.g., rows or columns in a term-document matrix where each row or column corresponds to a different document. Similarly, the graph structure may be converted into a matrix to expedite computing operations and conserve memory relative to other data structures, like key-value pairs (though embodiments are also consistent with the use of key-value pairs, e.g., with document identifiers serving as keys to lists of document terms).

In some embodiments, data obtained via the processes 100, 200, or 300 may include data from an internal dataset, where the internal data set may be an analyzed corpus of documents (or other objects) having semantic (or other) relationships (e.g., interrelationships between the documents) reflected in a graph taken as input for the processes 100, 200, or 300. Data obtained via the processes 100, 200, or 300 may additionally or alternatively include data from an external dataset, where the external dataset may include a different corpus of documents (or other data sources described below) that have information about things that both are discussed in the internal dataset and give rise at least in part to the graph (taken as input for the processes 100, 200, or 300). Thus, the external dataset may include content that was not considered when constructing the graph from which the output graph is to be derived. The external dataset, in some embodiments, may provide an independent source of information for evaluating the quality of the graph. The external dataset may be a different source of information from that considered when constructing the graph. For example, the external dataset may be structured or unstructured data. In some cases, the external dataset is a different instance of the above-described examples of corpora for the internal dataset, e.g., the internal dataset may be based on academic articles and the external dataset may be based on a body of journalism. In some cases, the external dataset may be retrieved from a different source or repository relative to the internal dataset, e.g., based on documents with different authors and published by different entities.

In some embodiments, the external dataset may be indexed to facilitate selection of documents, or the external dataset may be the result of selection, e.g., querying based on text of nodes of the graph. In some cases, the external dataset includes data relevant to the graph obtained with reference to an index. Examples include results from search engines and online encyclopedias, like Wikipedia™. In some cases, the external dataset may be obtained by searching the index for certain terms, like entity names or other keywords, and retrieving responsive documents. In some embodiments, the external dataset may be expanded to include other documents referenced by, for example hyperlinked to, documents within an external dataset, for example, online encyclopedia webpages linked to by a given online encyclopedia page. In some cases, this technique for expanding the external dataset may be repeated for some or all of the retrieved documents by following links. In other examples, the external dataset may be obtained by curation, for example, by a human analyst compiling a collection of documents known to be relevant to relationships revealed within the graph.

In some embodiments, the internal dataset or external dataset may be a corpus of documents that have undergone some processing, for example, feature extraction and compression to conserve memory and expedite processing. For example, in some cases, stop words or terms satisfying a threshold for term frequency inverse document frequency (TF-IDF) scoring may be filtered from the documents, removing those terms, and leaving the documents shorter. TF-IDF includes variants thereof, like BM25, wherein the effect of term frequency is dampened at higher occurrence rates. In another example, documents may be excerpted, for example, excluding all but the first and last paragraph of the document, or first and last paragraphs following a heading, as indicated by a markup language of the document. In some embodiments, documents may be excerpted by crawling a document object model and extracting unstructured text based on the location and context of the unstructured text within the document object model, for example, text within a bracketed set of tags indicating a title or body of an article.

In other examples, the external dataset may be or include structured data, for example, data in a relational database having a plurality of fields of information about given key values, like business names, product names, entity names, and the like, and the external dataset may be a collection of responses to queries corresponding to the key values. In another example, the external dataset may be triples in a resource description framework (RDF) format, for instance, or responses to queries to a knowledge graph, with query values or key values corresponding to things discussed within the internal dataset, for example, extracted entities, sentiments, topics, or combinations thereof. Other examples include data arranged in hierarchical serialized data formats, like extensible markup language (XML) or JavaScript object notation (JSON).

In some cases, the external dataset may be obtained by querying a larger data collection (e.g., unstructured text documents or relational databases, or the like) with query terms obtained from the internal dataset or from the internal dataset itself. For example, such query terms may be obtained by extracting entities mentioned in unstructured text of the internal dataset. Examples of techniques for extracting entities include techniques for named-entity extraction provided by the set of modules titled "A Nearly-New Information Extraction System" (ANNIE) in the General Architecture for Text Engineering (GATE) system published by the University of Sheffield, or the Named Entity Recognition feature of the Natural-Language Toolkit published by Team NLTK and available from nltk.org. In some cases, entities are extracted by parsing unstructured text, analyzing the first character of each term to determine whether the term is capitalized, and then determining whether proceeding terms are followed by a period to determine whether the term is likely a proper noun. Sequences of capitalized terms may also be detected and determined to constitute an entity name corresponding to a proper noun. In some embodiments, a collection of candidate proper nouns may be extracted, and those proper nouns having greater than a threshold TF-IDF score for the respective document may be designated as entities discuss within the document and used individually or in combination as query terms to retrieve or label the external dataset. Or some embodiments may receive manually entered inputs from humans, for instance, crowd-sourced external datasets.

In some embodiments, the external dataset may include a plurality of subsets of documents, for example, one subset for each query by which documents or other data is retrieved, and the respective subsets may be associated in memory with the query or the document upon which the query is based within the internal dataset. Thus, in some embodiments, each document in internal dataset may be associated with a different set of information in the external dataset (which is not to imply that such information may not be overlapping between different documents in the internal dataset or that every set of information in the external dataset made must be different for the different respective documents in the internal dataset). In some cases, when evaluating the quality of a connection between documents in the internal dataset indicated by the graph (taken as input for the processes 100, 200, or 300), the corresponding subsets of information from the external dataset may be retrieved and serve as the external dataset for purposes of subsequent steps. This correspondence may be determined before subsequent processes (e.g., by extracting entities and searching for every document in an analyzed corpus) or after subsequent processes in different embodiments (e.g., by searching within an external dataset based on the below-described adjacent nodes identified during evaluation of graph quality after nodes are identified as adjacent).

In some embodiments, the graph (taken as input for the processes 100, 200, or 300) may be a data structure in memory that indicates semantic relationships between documents in the internal dataset, which may be some or all of an analyzed corpus of documents. In some cases, the graph is a weighted graph having nodes corresponding to respective documents in the corpus and edges having weights indicating semantic similarity between pairs of nodes to which those edges connect (that is, semantic similarity between unstructured text in documents corresponding to those nodes, e.g., semantic similarity in the sense of distributional semantic similarity where bodies of text with similar distributions of terms are deemed to have similar meanings).

In some embodiments, the graph (taken as input for the processors 100, 200, or 300) may be arranged as a matrix. In some cases, each row and column of the matrix may correspond to one of the documents in a corpus, with each document having one row and one column of the matrix. Values within the matrix may indicate the semantic similarity between the document of the respective row and the respective column. Documents along a diagonal may have a zero value (or other designated value, like null), as the same document may match on the row and column, and it may be useful to distinguish those identity relationships from other non-identity semantic similarity values to avoid distorting measures of similarity. Thus, in some embodiments, the graph may be arranged as a square symmetric matrix. As the data structure indicates, adding additional documents to the corpus can dramatically expand the computational and memory intensity of a given analysis, as each added document potentially gives rise to pairwise relationships with every extant document in the matrix. Accordingly, for larger collections of documents, some embodiments may execute techniques described below for accelerating linear algebra operations in ways that account for the memory hierarchy of computer systems and compressing matrices in memory, particularly sparse matrices. The graph may be obtained with a variety of techniques, including using tools provided by Quid, Inc. of San Francisco, Calif., and the techniques described below. In other embodiments, the graph may represent relationships between things other than documents, e.g., other units of language (like corpa, paragraphs, or sentences), sentiments, terms, or entities (like businesses, products, places, or people).

In some embodiments, the graph (taken as input for the processes 100, 200, or 300) may be pruned to create an adjacency matrix. In some cases, computer processes may run faster and consume less memory, particularly for large datasets, as a result of such pruning, as unpruned applications may tend to scale poorly in terms of memory complexity and processing complexity. (That said, some embodiments may not prune and may have sufficient computational resources, which is not to suggest that any other step or process or feature described herein may not also be omitted in some embodiments.) In some cases, this step may include comparing each weighted edge to an adjacency threshold and removing those edges that fail to satisfy the threshold, e.g., have less than a threshold amount of semantic similarity. In some cases, removal of an edge may include designating the edge as removed (e.g., by setting its weight or other value to indicate the removal). In some cases, the resulting adjacency matrix (e.g., another square symmetric matrix with zeros along a diagonal, like that described above) may have fewer nonzero weighted edges between pairs of documents. In some cases, the adjacency matrix may constitute a sparse matrix amenable to techniques described below to conserve memory and expedite processing. Or in some embodiments, the adjacency matrix may remain a dense matrix.

In some embodiments, the graph (taken as input for the processes 100, 200, or 300) may be generated from a feature set matrix. In some cases, the feature set matrix may be a term document matrix of the corpus of the internal dataset (e.g., by which the graph is created). In some embodiments, the term document matrix may include a plurality of vectors, each vector corresponding to a respective document within the corpus, and values within the vector corresponding to the presence, number, or frequency of occurrences of n-grams within the respective document. In some cases, these vectors may be appended to one another (e.g., side-by-side) to constitute the feature set matrix, for example, rows of the matrix may correspond to documents, and columns to n-grams, or vice versa. In some cases, the vectors may be appended to one another in the same order as documents are listed across rows or columns in the adjacency matrix (e.g., as tuples) to facilitate linear algebra operations and conserve memory over systems that label these values independent of sequence.

In some cases, the feature set matrix may be created by parsing unstructured text of the internal dataset, for example, initially on a word-by-word basis, and updating a document vector as each word is encountered, for example, by incrementing a count for a value of the vector corresponding to the encountered word after the word is encountered. In some cases, to expedite access, the values of the vector may be sequenced in a particular fashion, for example alphabetically, to facilitate a binary search, or according to a hash table, e.g., with some amount of collisions being tolerated. Further, the same document may be parsed on a pair-of-terms basis, with a similar updating routine to update values corresponding to n-grams having an in value of two, and then a similar process may be performed on a sequence of three terms basis. In some embodiments, such parsing may be done in parallel, e.g., with a MapReduce implementation, to expedite processing, with different portions of the vector assigned to different threads or computing devices, that then return a subset of the vector that is appended to the other subsets. In some cases, counts may be divided by a count of terms in a document to determine a frequency. In some cases, alternatively or additionally, a co-occurrence matrix may be determined with similar techniques, e.g., when analyzing similarity relatedness of entities or terms in documents.

In some cases, some terms may be disregarded as having low information value. In some embodiments, a list of stop words may be maintained and compared against parsed values to determine whether to disregard the parsed term, e.g., upon determining the parsed word is a stop word. Examples of stop words include terms like "the," "and," "a," and other relatively common terms.

Some embodiments may use more sophisticated techniques to determine which terms to disregard or down weight. Examples include term frequency inverse document frequency analysis. Some embodiments may, either based on a sample or analysis of an entire corpus, determine a term frequency-inverse document frequency of n-grams and disregard n-grams failing to satisfy a threshold score, indicating the terms are relatively frequent and about as frequent within a given document as they are within a larger corpus. This is expected to increase the sparseness of the feature set matrix, which may enhance the effect of various techniques described below for expediting operations on and reducing the memory consumed by sparse matrices. In some embodiments, the size of n-grams may range from an n-gram of a single term up to an n-gram of a plurality of terms, for example, more than or equal to three terms, five terms, or seven terms, depending upon available computing resources and diversity of language in use. As a result, in some embodiments, the corresponding term document matrix may be relatively large, as there are a relatively large number of different terms and sequences of terms that may occur within a given corpus. Another attribute of this matrix is that in some cases, many of the values may be zero, as many of the terms occurring in other documents will not occur within a given document, giving rise to the sparse matrix designation.

As shown in FIG. 1, some embodiments may obtain a first graph comprising nodes and edges, as indicated in step 102. Each of the nodes may correspond to documents of a corpus, e.g., in a document similarity (or other relationship) graph. Each of the edges links two of the nodes. In some embodiments, each of the first-graph edges may link two of the first-graph nodes. In some embodiments, each of the first-graph edges may denote semantic similarity of unstructured text in documents corresponding to the two linked first-graph nodes. In some embodiments, the first graph may be generated from natural language processing of a corpus of unstructured text documents. In some cases, depending on the type of relationship, the edges may be directed (e.g., in a species-genus graph), or the edges may be undirected (e.g., in some types of similarity graphs). In some embodiments, the first graph may include more than 1,000 nodes and more than 2,000 edges or, in many commercially relevant use cases, more than 10,000 nodes and more than 20,000 edges, or more than 100,000 nodes and more than 500,000 edges. Embodiments are not limited to input graphs where the nodes represent documents. In some embodiments, the nodes of the first graph may represent sentiments, terms, entities, or other features, where the graph may, for example, represent relationships therebetween (e.g., species-genus, semantic similarity, semantic differential, etc.). In some embodiments, the edges may be trimmed to remove those relationships scoring below a threshold, or some embodiments may obtain a fully connected graph, before trimming, to permit biasing of all of the trimming determinations.

In some embodiments, a second graph may be derived from the first graph, such that the second-graph nodes respectively correspond to attributes of the first graph nodes (e.g., entities mentioned in documents, products offered by businesses, past occupations of people, etc.) To derive a graph, another type of node and values thereof may be selected from information associated with nodes of the first graph (e.g., the type may be people mentioned in documents, and the values may be the names of people mentioned in the documents). In some embodiments, for each of the first-graph nodes, the nodes of the second graph may be selected from attributes of the unstructured text documents (to which the respective first-graph node corresponds), as indicated in step 104. In some embodiments, the attributes may be entities mentioned in the unstructured text documents or other features of the unstructured text documents, and each of the second-graph nodes may correspond to a respective selected attribute (e.g., a respective selected entity or other feature). (It should be noted that the "other features" are different in at least some respects from the features by which the first graph was generated, as derived graphs are necessarily different in at least some sense from the graph from which they are derived.)

Some embodiments may extract the attributes (to which the nodes selected for the second graph respectively correspond) from information of the corpus from which the first graph was generated. In some embodiments, the attributes may be extracted from a plurality of metadata attributes of documents corresponding to one or more of the first-graph nodes or from information external to the corpus from which the first graph was generated. For instance, for business entities, the attributes may relate to values extracted from the Securities and Exchange Commission's EDGAR database, like annual revenue, employee count, profit, capitalization, loss, keywords in particular sections, etc., or the attributes (or their related values) may be extracted from a web site of the business, like a search engine ranking of the business's web site in response to a particular keyword.

In some cases, each node of the first graph may correspond to several nodes of the second graph, and in some cases, a node in the second graph may correspond to several nodes in the first graph. For instance, a given body of text in a document may mention several businesses, and each of those businesses may be mentioned in several documents (though not necessarily the same document). In some cases, the average ratio of first document nodes to second document nodes may exceed two, five, ten, twenty, or greater to one.

In some embodiments, edge weights for respective pairs of the second-graph nodes (e.g., a plurality of nodes of the second graph) may be determined. In some embodiments, for each pair of the second-graph nodes, a respective edge weight (indicating similarity, or other relationship, between a first attribute corresponding to a first node of the respective pair and a second attribute corresponding to a second node of the respective pair) may be determined, e.g., in accordance with one or more of steps 108-114. In some embodiments, the first attribute is a first entity or other feature represented by the first node, and the second attribute is a second entity or other feature represented by the second node.

Some embodiments may probabilistically walk the first graph and measure the probability of traveling from a node associated with the first attribute to a node associated with a second attribute. For instance, some embodiments may determine the probability of randomly walking in a document similarity graph from a document that mentions a first person to another document that mentions another person. Higher probabilities are expected to indicate a similarity relationship between the two people, or other attributes.

As indicated in steps 108 and 110, a source node of the first graph (from which the first attribute was selected) may be determined. In some cases, the source node is determined by selecting an attribute, e.g., by iterating through a list of attributes constituting nodes of the second graph, and then querying a document feature matrix for documents that mention the attribute (e.g., having a person or business name). The node is referred to as a source node because some embodiments may follow a probabilistic walk through the first graph from the source node. In some cases, the nodes of the first graph, including the source node, may be relatively highly connected (e.g., having, on average, two, three, five, twenty, or more adjacent nodes sharing an edge following a pruning step).

Next, a node of the first graph may be sampled from one or more nodes adjacent (or within some threshold number of degrees of separation) the source node of the first graph. The node may be sampled via probabilistic sampling techniques in some cases to reduce bias. In some embodiments, the node may be sampled by randomly (e.g., pseudorandomly, like with a least significant digit of value output by a linear shift register) selecting a node of the first graph from a plurality of nodes adjacent the source node in the first graph. In some embodiments, the random selection may be a pseudorandom selection (e.g., by executing a RdRand instruction and applying a seed value). In some cases, the random sampling of nodes renders the generation of derivative graphs, such as the second graph, computationally feasible (e.g., in some cases where the graphs on which the derivative graphs are based are large graphs or in other cases) or otherwise reduces the computational costs relative to systems that exhaustively evaluate every connection to the source node (and, in some cases, second or third order connections). That said, embodiments are also consistent with non-probabilistic analyses of the first graph, e.g., by determining population statistics rather than sample statistics.

As indicated in steps 112, the sampled node may be determined to be (or determined not to be) a destination node. A destination node is a node containing the second attribute (e.g., one from which the second attribute was obtained or could have been obtained, as attributes are often contained by several nodes in the first graph). Thus, the source node may have adjacent several nodes in the first graph, and only a subset of those nodes may be destination nodes. Probabilistically selecting a subset of these adjacent nodes and determining which are destination nodes and which are not is expected to provide a measurement of the larger population, e.g., the full set of connections in the first graph, without incurring the computational burden of examining every adjacent node. Sampling may be with our without replacement, depending on the embodiment.

Based on (e.g., based in part on) the determination, a value indicating an amount of similarity (or other relationship) between the first attribute and the second attribute may be determined. For example, if a source node mentioning "John Doe" has 50 adjacent nodes, ten are randomly sampled, and five of the sample are determined to be destination nodes mentioning "Jane Smith," some embodiments may infer a similarity between the "John Doe" and "Jane Smith" according to the ratio of 1/2 (from 5/10), as one half of the measured adjacent nodes have the second attribute. In the same example, if another source node mentioning "Jane Smith" has 80 adjacent nodes, ten are sampled randomly, and 2 are determined to be destination nodes mentioning "Jack Roberts," the relationship between "Jane Smith" and "Jack Roberts" may be based on the ratio of 1/5 (from 2/10). Further, the relationship between "John Doe" and "Jane Smith" may be determined to be stronger than the relationship between "Jane Smith" and "Jack Roberts."

Some embodiments may expand on this process to multiple degrees of connection in the first graph. For instance, some embodiments may sample first degree connections (e.g., adjacent nodes) at a particular amount, second degree connections (nodes adjacent a node adjacent the source node) at a different amount, and third degree connections at a different amount. The ratio of destination nodes among the sample population may be determined for each degree of connection in the first graph, and a relationship (e.g., similarity) score between the attributes may be determined by aggregating these numbers, e.g., in a weighted sum, where the closer connections are weighted higher than higher degree connections. In some cases, the number of hops in the first graph may also be probabilistic, or a threshold number may be explored. Some embodiments may determine whether each node along a path is a destination node, or some embodiments may only determine whether a terminal node along a path is a destination node.

In some embodiments, the analysis may account for the weights of edges in the first graph. For instance, the selection of adjacent nodes may be based on the weights, such that adjacent nodes connected with a greater weight have a higher probability of being selected. For example, the weights of adjacent nodes may be normalized such that the sum of the weights totals to one, and each adjacent node may be assigned a range corresponding to its normalized value. For example, the normalized weight of the second edge may be added to the normalized weight of the first edge, and so on, to determine ranges. For instance, a first edge may have a range from 0 to 0.1; a second edge with greater weight from 0.1 to 0.3; a third edge with a smaller weight from 0.3 to 0.35; and so on, up to 1. Then a random value between 0 and 1 may be matched to the corresponding range to select an edge, thereby favoring those edges with a greater weight. As a result, in some embodiments, each eligible step along an old link is taken with probability proportional to the weight of the link among all eligible links, and both qualitative and quantitative relationships in the first graph may inform the edges of the derived graph.

As noted, in some cases, an attribute may correspond to multiple nodes (e.g., documents) in the first graph. Some embodiments may also probabilistically sample these nodes, e.g., sampling 20 out of 200 such nodes, and 30 out of 300 edges for each, or some embodiments may analyze every node in the first graph that constitutes a source node. In some cases, scores from each such source node may be combined. Some embodiments may determine an aggregate probability of moving between a source and destination node, e.g., the total number of sampled adjacent nodes among all of the source nodes divided into the total number of detected destination nodes.

As noted, in some cases, a single node in the first graph (e.g., a document) may correspond to multiple attributes (e.g., may mention a relatively large number of entities). In some embodiments, an entity frequency inverse document frequency measure (EF-IDF) like the TF-IDF measures described above may be used to adjust measurements (e.g., by counting entity mentions rather than more general n-gram mentions). For instance, rather than count a detected destination node with a value of one, some embodiments may determine a number of attributes of the detected destination document and divide the number of attributes by some value (e.g., a cardinality of attributes among all of the documents analyzed for a given source node or source attribute). The modified values may then be aggregated with the techniques described above. In some cases, this measure may be used both for the source and destination. For instance, some embodiments may determine a source EF-IDF and a destination EF-IDF for each detected destination node. Resulting probabilities may be weighted based on both of these sets of values, e.g., by multiplying by the values, or multiplying by an average, mean, median, mode or other measure of central tendency of the values. As a result, some embodiments may register relatively strong connections between attributes in response to those attributes being among a relatively small number of attributes in both the source and destination nodes of the first graph.

As indicated in step 114, in some embodiments, the edge weight with respect to the edge for the pair of nodes in the second graph (corresponding to the first and second attributes) may be determined based on the attribute-similarity value. In some cases, the respective edge weight may be the attribute-similarity value. In some cases, the respective edge weight may be the output of a function to which the attribute-similarity value is provided as an input. For instance, the attribute-similarity value may be normalized over the full population, by attribute instance, or otherwise scaled. In some cases, the attribute similarity-value may be adjusted with a weighting based on exogenous information, e.g., a difference between reported revenue of companies, or a difference between geographic locations of businesses.

In some embodiments, the attribute-similarity value may be determined based on the first graph, the first-graph nodes, the first-graph edges and weights thereof, or other considerations. In some embodiments, the attribute-similarity value (between the first attribute and the second attribute from which the source node and the destination node were respectively selected) may be based on a probability related to a traversal of the first graph from the source node to the destination node. In some cases, the related probability may be determined based on the number of edges or weights thereof between the source node and the destination node in the first graph. That is, the edge weights in the second graph between pairs of attributes may be determined based on the probability of random (or Markov) walks in the first graph extending between nodes having those attributes. (Or, as noted, some embodiments may base this on population, rather than sample, statistics.)

As shown in FIG. 2, for example, a determination of whether there is an edge or combination of edges (in the first graph) linking the source node to a destination node may be effectuated, as indicated in step 202. In response to a determination that there is no edge or combination of edges linking the source node to the destination node, the related probability may be determined to be zero, as indicated in step 204. In response to a determination that there is an edge or combination of edges linking the source node to the destination node, the related probability may be determined based on the weights of the edge or combination of edges linking the source node to the destination node, as indicated in step 206. The attribute-similarity value (indicating the amount of similarity between the first attribute and the second attribute) may be determined based on the related probability, as indicated in step 208.

As an example, in some embodiments, respective edge weights for a derivative graph (e.g., a second graph generated from a first graph in accordance with one or more of steps 102-114) may be determined as follows:

Denote by $U\_1, U\_2, \ldots, U\_N$ as the nodes of the original graph.

Denote by $V\_1, V\_2, \ldots, V\_M$ as the nodes of the derivative graph, which are also attributes of the nodes of the original graph.

A random (e.g., pseudorandom) walk may be performed via: (1) one step from an attribute associated with an original-graph node, then (2) a sequence of zero or more steps, first from that original-graph node to one of its neighboring original-graph nodes, then from the just-reached original-graph node to one of its neighbors, and so on, then (3) one step from the final original-graph node of the sequence to one of its associated attributes.

In some embodiments, the weight of the edge between $V\_I$ and $V\_J$ is related to the probability that a walk taken from $V\_I$ in this fashion ends at $V\_J$. In some cases, attribute associations are unweighted, and each step to or from an attribute is equally favored among all steps that are then eligible. In some cases, edges of the original graph may be weighted, and each eligible step along an original-graph edge is taken with probability proportional to the weight of the original-graph edge among all eligible edges of the original graph.

As the original graph or the derivative graph may be represented as matrices, the following details for one or more embodiments involve matrices.

Matrix A

Let $W(I, J)$ be the weight of the original-graph edge between original-graph nodes $U\_I$ and $U\_J$ if the edge exists; else let $W(I, J)$ be 0.

Let $R(I)$ be $W(I, 1)+W(I, 2)+\ldots +W(I, N)$.

Let $A(I, J)$ be $W(I, J)/R(I)$ if $R(I)$ is not 0; else let $A(I, J)$ be 0.

Let A denote the matrix of N rows and N columns whose entry in the Ith row and Jth column is $A(I, J)$.

Matrix B

Let $S(I)$ be the number of original-graph nodes associated with attribute $V\_I$.

Let $B(I, J)$ be $1/S(I)$ if $V\_I$ is an attribute of node $U\_J$; else let $B(I, J)$ be 0.

Let B denote the matrix of M rows and N columns whose entry in the Ith row and Jth column is $B(I, J)$.

Matrix C

Let $T(I)$ be the number of attributes associated with original-graph node $U\_I$.

Let $C(I, J)$ be $1/T(I)$ if $V\_J$ is an attribute of node $U\_I$; else let $C(I, J)$ be 0.

Let C denote the matrix of N rows and M columns whose entry in the Ith row and Jth column is $C(I, J)$.

Matrix H

Select a real number t at least 0. Let H denote the matrix of M rows and M columns defined by the formula, $H = \exp(-t) B \exp(tA) C$, where exp is the exponential function.

Matrix G

Select a real number r greater than 1. Let G denote the matrix of M rows and M columns defined by the formula, $G = B(Y-A/r)^{(-1)} C(r-1)/r$, where Y denotes the identity matrix of N rows and N columns.

Matrix X

Select an integer t greater than 0. Let X denote the matrix of M rows and M columns defined by the formula, $X = B[Y+A+A^2+\ldots+A^{(t-1)}]C/t$, where Y denotes the identity matrix of N rows and N columns.

New Edge Weights

A derivative graph may be generated based on at least one of the three matrices H, G, and X. Select Z to be one of H, G, or X. The weight of the derivative-graph edge between $V\_I$ and $V\_J$ is $[Z(I, J)+Z(J, I)]/2$.

Length of the Walk

Let Y denote the identity matrix of N rows and N columns. Let $(I, J)$ written after a matrix denote the entry in the Ith row and Jth column of the matrix.

Consider the part of the random walk confined to nodes of the original graph, that is, excluding attribute steps at the beginning and end.

First, $Y(I, J)$ is the probability that a 0-step walk from node $U\_I$ ends at $U\_J$.

Second, $A(I, J)$ is the probability that a 1-step walk from node $U\_I$ ends at $U\_J$, provided that node $U\_I$ has a neighbor, so that a 1-step walk from $U\_I$ exists.

If K is greater than 0, the event E that a K-step walk from node $U\_I$ ends at $U\_J$ may be partitioned according to the penultimate node U of the walk.

The probability $P(E)$ of event E is: $P(E)=P(U=U\_1)P(E|U=U\_1)+P(U=U\_2)P(E|U=U\_2)+\ldots+P(U=U\_N)P$ (E|U=U_N), where P(U=U_1) denotes the probability that the penultimate node is U_1, and P(E|U=U_1) denotes the (conditional) probability of event E given that the penultimate node is U_1.

Therefore, the probability that a 2-step walk from node U_I ends at U_J is $A(I, 1)A(1, J)+A(I, 2)A(2, J)+ \ldots +A(I, N)A(N, J)=A^2(I, J)$. Here $A^2$ denotes matrix A raised to the second power (by matrix multiplication). Note that $A^2(I, J)$ stands for the entry in the Ith row and Jth column of $A^2$, not the square of the entry in the Ith row and Jth column of A.

The probability that a 3-step walk from node U_I ends at U_J is $A^2(I, 1)A(1, J)+A^2(I, 2)A(2, J)+ \ldots +A^2(I, N)A(N, J)=A^3(I, J)$.

The probability that a K-step walk from node U_I ends at U_J is $A^K(I, J)$ for each integer K at least 0.

Random Walks of Random Length

As shown below, matrices H, G, and X may facilitate the generation of the derivative graph. With respect to the matrix X, for example:

Select a positive integer t.

Choose an integer K at least 0 and less than t uniformly randomly, and take a random K-step walk on the original graph in the prescribed fashion.

If the value of t is known, but the value of K is not, the probability that such a walk from node U_I ends at U_J is the entry in the Ith row and Jth column of matrix $[Y+A+A^2+ \ldots +A^{(t-1)}]/t$.

The matrix X obtained from this one by a B-left-multiplication and a C-right-multiplication gives the probability that a walk from attribute V_I to the original graph, followed by fewer than t steps within the derivative network, followed by a step to an associated attribute of the last original graph node, and ending at attribute V_J.

The use of matrix H is similar, as it involves the series $\exp(tA)/\exp(t)=[Y+t A+(t A)^2/(2!)+(t A)^3/(3!)+ \ldots ]/\exp(t)$, corresponding to a walk of an unbounded number of steps.

Long walks may be unlikely due to the rate of growth of the factorial function, and long walks may be less likely if t is small.

Similarly, the use of matrix G involves the series $(Y-A/r)^{\wedge}(-1) (r-1)/r=[Y+A/r+A^2/r^2+ \ldots ] (r-1)/r$.

The distribution of walk lengths is geometric. A K-step walk is r times less likely than a (K−1)-step walk for K greater than 0.

In some embodiments, the edge weights may be at least 0 and at most 1. In some embodiments, the range of the edges may be different. The weight of each derivative-graph edge may be the average (e.g., arithmetic mean) of two probabilities.

An Example Use Case

In one example use case that is substantially more simple than commercially relevant embodiments, three companies and their home countries may be examined, where Alphaco is an American and British company, Betaco is an American company, Gammaco is a British company, and Deltaco is a French company, where U_1 is Alphaco, U_2 is Betaco, U_3 is Gammaco, and U_4 is Deltaco, and V_1 is the United States, V_2 is the United Kingdom, and V_3 is France.

Matrix C may be represented as:
[[0.5 0.5 0.]
[1. 0. 0.]
[0. 1. 0.]
[0. 0. 1.]]

Matrix B may be represented as:
[[0.5 0.5 0. 0.]
[0.5 0. 0.5 0.]
[0. 0. 0. 1.]]

In this example, (1) the business of Alphaco is 90% like that of Betaco, 30% like that of Gammaco, and 10% like that of Deltaco, (2) the business of Betaco is 50% like that of Gammaco and 40% like that of Deltaco, and (3) the business of Gammaco is 20% like that of Deltaco.

Similarities may be normalized so that matrix A may be represented as:
[[0. 0.69 0.23 0.08]
[0.5 0. 0.28 0.22]
[0.3 0.5 0. 0.2]
[0.14 0.57 0.29 0.]]

Matrix X with t equal to 2 may represented as:
[[0.61 0.31 0.075]
[0.46 0.47 0.069]
[0.32 0.18 0.5]]

According to this method, the business of American companies is 39% like that of British companies and 20% like that of French companies, and the business of British companies is 12% like that of French companies.

In the above examples, similarity of countries are inferred from their associations to companies. In contrast to techniques using only discrete similarity measurements (e.g., where two countries may be considered company-similar if and only if a company exists with associations to both countries), such inferences are expected to allow some similarity between countries to be discerned even in the case that each company is designated as associated with only one country. With respect to the above examples, for instance, while the United States and the United Kingdom may be determined to be similar using discrete similarity measurements, such discrete similarity measurements may not indicate France to be similar to either the United States or the United Kingdom.

In some embodiments, a graph or its derivative graph may be pruned to remove edges or supplemented to add edges. In some cases, removal of an edge may include designating the edge as removed (e.g., by setting its weight or other value to indicate the removal of the edge), and adding of an edge may include designating the edge as added (e.g., by setting its weight or other value to indicate the addition of the edge).

In some embodiments, a second graph may be derived from a first graph in accordance with one or more of steps 102-114. As shown in FIG. 3, in some embodiments, the second graph may be pruned to remove edges in accordance with one or more of steps 302-308. As an example, an edge (shared between a node of the second graph and a respective adjacent node) to be assessed may be determined, as indicated in step 302. A determination of whether the respective edge weight of the shared edge satisfies a threshold score for maintaining an edge may be effectuated, as indicated in step 304. As indicated in step 306, in response to the respective edge weight not satisfying the threshold score, the shared edge may be removed. In response to the respective edge weight satisfying the threshold score, the shared edge may be maintained (and not removed). As indicated in step 308, a determination of whether there are other edges (shared between other nodes of the second graph or other respective adjacent nodes) to be assessed (e.g., that haven't yet been assessed for potential pruning of edges or other purposes). In response to another edge of the second graph that is to be assessed, the other edge may be assessed in accordance with one or more of steps 302-308.

In some embodiments, the second graph may be supplemented to add edges. In some cases, respective edge weights for potential edges between nodes of the second graph may be determined in accordance with one or more of steps 106-114. A determination of whether a respective edge weight of a potential edge satisfies a threshold score for maintaining (or adding) an edge may be effectuated. In response to the respective edge weight satisfying the threshold score, an edge may be added for the two corresponding nodes. In response to the respective not satisfying the threshold score, an edge may not be added for the two corresponding nodes.

In some embodiments, the multiplied matrices may be relatively large as compared to the available computing resources and time available. In some use cases, these challenges may be mitigated by using some of the below-described techniques for expediting matrix operations. Or, for simple use cases, a more naive approach may be used, by which, for a given row, each column is iteratively retrieved from a lower level of a memory hierarchy (e.g., storage, random-access memory, L3 cache, and L2 cache, up to processor registers), multiplied by corresponding values of the given row and then summed, with the resulting value written into the corresponding row and column position of matrix 38. In this example, each column may be moved up the memory hierarchy to the processor multiple times, for example, at least once for each row, and in some cases multiple times for each row. For larger analyses, though, these operations may impose substantial delays in the aggregate, as the time taken to move data, for example, from storage to a central processing unit (CPU) register, or even from dynamic random access memory (DRAM) to a CPU register, can be several orders of magnitude longer than the time taken to access a given value in a CPU register, or even a higher level of cache memory on the CPU. That said, some embodiments may use this simpler approach to conserve developer time where the scale of the datasets and available computing hardware permit such implementations.

Some embodiments may utilize the derivative graph (e.g., a second graph generated based on a first graph in accordance with one or more techniques described herein) to present a data visualization that show entities or other attributes (corresponding to the nodes of the derivative graph) and their relationships with one another that may not have been apparent via a data visualization of the original graph or in a manner that was not feasible via a data visualization of the original graph. In some embodiments, one or more search queries may be performed on the derivative graph to obtain results that are more relevant to the attributes corresponding to the nodes of the derivative graph and/or in a more efficient manner than by querying the original graph. Some embodiments may select among isomorphic representations of the derivative graph based on the respective edge weights determined for edges of the derivative graph, e.g., by calculating an energy of nodes in various candidate isomorphic representations with a physics model based on the determined edges weights and selecting a candidate with the lowest energy.

In some embodiments, at least a subset of the steps of the processes 100, 200, and 300 may be performed to generate a derivative graph. In some embodiments, the processes 100, 200, or 300 may be performed within a single instance of one of the computing systems described below with reference to FIG. 5, or some embodiments may distribute some portions of the operations amenable to parallelization across multiple computing systems. Certain matrix operations, however, are not expected to be amenable to such distributed processing when accounting for delays due to network exchanges across a local area network. In some embodiments, the processes 100, 200, or 300 may be performed with entire matrices held in program state, for example at a DRAM level or higher level of a memory hierarchy.

In some embodiments, the derived graph may be further to facilitate further insights. For example, in some cases, the number of nodes of the derived graph may exceed the amount of information that a human can effectively process. To provide an overview of the results, some embodiments may cluster the derived graph with a clustering algorithm suitable for graph processing, like Markov Cluster Algorithm. As a result, some embodiments may produce both a measure of the similarity of entities mentioned in documents, as well as a taxonomy by which the entities may be grouped, in some cases, all with unsupervised learning techniques, and without the burden of labeling training data. (Though embodiments are also consistent with supervised techniques.) In some embodiments, the second graph, or the clustered second graph, may be displayed with the techniques described below for causing graphs to be displayed.

The steps of the processes 100, 200, and 300, like the other examples herein, are intended to be illustrative. In some embodiments, the processes of 100, 200, or 300 may be accomplished with one or more additional steps not described, and/or without one or more of the steps discussed. Additionally, the order in which the steps of the processes 100, 200, or 300 are illustrated in FIGS. 1, 2, and 3, respectively, and described below is not intended to be limiting. Nor is this to suggestion that any other embodiment is so limited.

Figure 4:
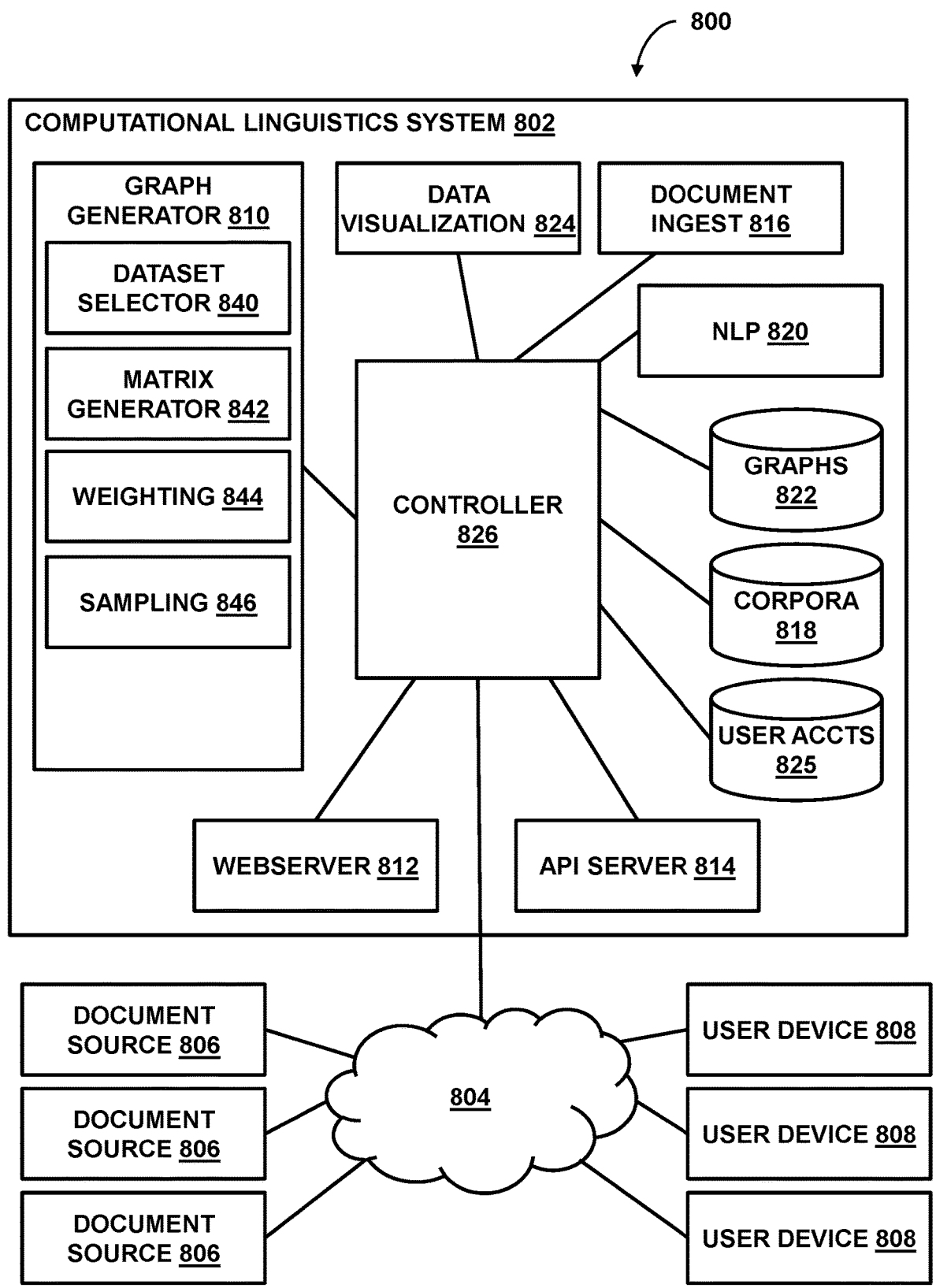
FIG. 4 is a block diagram of an example of a system configured to perform the process of FIG. 1, 2, or 3.

FIG. 4 illustrates, in block diagram form, the logical architecture of an example of a computing environment 800 in which the above-described techniques may be implemented. In some embodiments, computing environment 800 includes a computational linguistics system 802, the Internet 804, document sources 806, and a plurality of user devices 808, such as personal computers, laptops, or mobile devices having the features of the below-described computer systems. Representative devices are shown, but it should be understood that substantially more devices and instances may be used in commercial embodiments, e.g., more than 100, or more than 1,000 user devices, and more than 10, or more than 100 document sources.

In this example, subscribing users may submit queries to the computational linguistics system 802 (which may be geographically remote) via a web browser executing on user devices 808 and exchanges over the Internet 804. In some embodiments, users may submit queries to view (or otherwise interrogate, e.g., search) trends, entity relationships, sentiment relationships, term relationships, or document relationships (e.g., graphs of such relationships) determined by the computational linguistics system 802 based on unstructured plain text documents. These documents, in some cases, may be retrieved (e.g., downloaded) from content hosted by third party document sources 806, in some cases as batch downloads in advance of queries.

In some embodiments, the computational linguistics system 802 may include a graph generator 810 to perform the above-described techniques, a web server 812, an application-program interface (API) server 814, a document-ingest module 816, a corpora repository 818, a natural-language processing module 820, a graph repository 822, a data visualization module 824, a user-account repository 825, and a controller 826. The controller 826 may coordinate the described operations of the other modules. In some cases, prior to granting access, the controller 826 may confirm a user's credentials against a user account in the user-account repository 825 for security purposes and to verify whether a user account is current, e.g., a subscription fee has been paid.

In some embodiments, the graph generator 810 may execute the processes 100, 200, or 300 of FIG. 1, 2, or 3, respectively. In some embodiments, the graph generator 810 may include a dataset selector 840, a matrix generator 842, a weighting module 844, a sampling module 846, or other components. In some embodiments, the dataset selector 840 may obtain data from one or more datasets. In some embodiments, the dataset selector may obtain a graph as input for graph generation, identify nodes and adjacent nodes, generate a derivative graph from an input graph, and ingest and store responsive data, as described above. In some embodiments, the matrix generator 842 may be operative to generate a matrix based on data from one or more datasets (e.g., to generate a matrix to represent a graph if the matrix form is desired and the graph is not already in the matrix form, to generate an adjacency matrix by pruning the graph, etc.). In some embodiments, the weighting module 844 may be operative to determine respective edge weights for edges of a graph, prune or supplement the graph based on the respective edge weights, etc. In some cases, the weighting module 844 may be operative to determine respective weights for edges of a derivative graph, or prune or supplement the derivative graph, as described above (e.g., with respect to steps 106-114, 202-208, 302-308, etc.). In some embodiments, the sampling module 846 may be operative to perform sampling of a graph, including nonprobability or probability sampling techniques. In some cases, the sampling module 846 may be operative to perform sampling of a node of a graph from one or more nodes proximate the node in the graph, as described above.

In some embodiments, results may be stored in memory, e.g., in the graph repository 822 in association with the corresponding graph, or results may be transmitted to a user device for display in a web browser, e.g., in response to a query for a specific graph. In some cases, visual weight or visual attributes of displayed graphs, like node or edge size, color, drop shadow, transparency, or attributes of a physics-based simulation (like in a force directed layout of a graph) may be modified based on quality measures for individual nodes or edges.

In some embodiments, computational linguistics system 802 may include a web server 812 and an application-program interface (API) server 814. These servers may listen to corresponding network ports, maintain session state for various sessions with user devices 808, advance requests and posted data to controller 826, and send responsive data to user devices 808. In some cases, responses may be in the form of web pages, like serialized bodies of markup language, cascading style sheets, and JavaScript™ instructions used by web browsers to render content, like inputs for making requests or data visualizations of query responses. In some embodiments, the API server 814 may be operative to send structured responsive data, like XML or JSON formatted responses to queries and receive machine-generated requests. In some embodiments, the servers may be blocking servers, or the servers may use various techniques to process multiple requests concurrently, e.g., with various asynchronous programming techniques, like by tracking and implementing deferreds or promises.

In some embodiments, the document-ingest module 816 may obtain collections of documents and store those documents in corpora repository 818, which may have analyzed corpora of unstructured plain text documents used to generate the presently described graphs. In some embodiments, the documents may be obtained from different document sources 806, such as remote, third-party repositories of documents, like web servers.

In some embodiments, retrieved and stored corpora are collections of unstructured text documents. In some embodiments, the unstructured text may be included within structured portions of other documents, for example, rendered text within markup instructions in a webpage, or unstructured text embedded in a serialized data format, like paragraphs within an extensible markup language document or JavaScript™ object notation document. This surrounding structure notwithstanding, in some embodiments, at least some, and in some cases most or only, the text analyzed in constructing graph topologies is unstructured text, like human readable plain text in prose form with markup instructions and scripting language instructions removed. For instance, an automated web browser, like Selenium™, may be executed to retrieve web pages, execute scripts and render markup language to construct a document object model of the webpages, and parse visible text from the web pages that is retrievable from ".text" attribute of a DOM object containing the text. Removing the computer-readable portion is expected to cause documents to be grouped according to their content intended to be read by humans, rather than according to the programming library or practices invoked by a developer. Or some embodiments may leave this markup language and scripting instructions in place to analyze documents according to their mode of construction or to weight terms according to their visual weight when rendered or annotate terms according to their context. In some embodiments, the text may be encoded as Unicode or ASCII text.

In some cases, an analyzed corpus may be relatively large, for example, more than 100 documents, more than 1,000 documents, or more than 10,000 documents, and connections indicating semantic similarity between the documents (or entities, sentiments, terms, or the like, as described below) may be relatively numerous, e.g., more than 5 connections on average between documents, like more than 50, more than 500, or between each unique pair of documents. In some embodiments, each of the documents may also include a substantial amount of text, for instance, more than 100 words, more than 500 words, or more than 2,000 words.

In some embodiments, an analyzed corpus used to construct a graph may be relatively large. For expected use cases of the present inventions, the corpus is larger than would be economically feasible for humans to manually perform the processes 100, 200, or 300 in reasonable amounts of time, and computers are required to implement the processes 100, 200, or 300 in commercially relevant intended applications. For example, the corpus may include more than 50 documents, like more than 500, or more than 5,000 documents. Further, in some embodiments, the documents within the corpus may be relatively long, for example, having a median length of more than 50 words, like more than 500 or more than 5,000 words, depending upon the use case.

The necessity of computer implementation, even for relatively small corpora, can arise from the number of documents, the length of documents, or the semantic pairwise interrelationships between the documents, which can give rise to data structures that can grow factorially with each additional document depending upon how aggressively semantic links between documents are pruned. Due to this scaling effect, each additional document in some applications can impose substantial additional computational and memory burdens, and increasing the number of documents even by a small amount can be a nontrivial problem, particularly without the benefit of some of the techniques described herein to expedite computer processing of the analysis and conserve limited memory within a computer system.

In some embodiments, the documents within the corpus may be related in some fashion, for example, all from the same source or related to a category of topics, entities, sentiments, or the like. Examples of corpora include academic literature, like scientific literature, medical literature, economic literature, psychological-research literature, and the like, for instance, from a given journal, university, country, or academic institution. Other examples include webpages, for example, from businesses, like the 500 highest ranking business entity websites responsive to a given query, businesses within a given region, businesses in a given industry, businesses at a given state of development (like emerging businesses), or combinations thereof, like startups in Silicon Valley targeting the shipping industry to give one example. Other examples of corpora include documents hosted in government databases, like the full text patent database hosted by the United States Patent Office, regulatory filings with the Securities and Exchange Commission hosted in the Edgar database, court filings within the Pacer database, Federal Communication Commission filings, United States Food and Drug Administration filings, and the like. Another example of corpora includes various bodies of journalism, like catalogs of newspapers, magazines, and the like. Relevant corpora also include social media posts, for example, microblog posts, blog posts, posts within social networks, and the like, as well as resumes, job postings, and product manuals.

In some cases, the corpus is obtained by processing non-text documents, for example, by performing optical character recognition on image-formatted documents or by submitting photographs to image recognition and description algorithms that return a prose description of photographs. In some cases, the corpus may be obtained without metadata indicating the semantic relationships between documents within the corpus, and these relationships may be discerned, for example, with software provided by Quid of San Francisco, Calif., or by performing latent semantic analysis or other distributional semantic techniques to construct the graphs described herein. In some cases, the analysis may be performed by an unsupervised machine learning technique, or some embodiments may train supervised machine learning models (e.g., with stochastic gradient descent) based on a training set, like text data having manually-labeled features. Unsupervised methods are expected to be less expensive and more broadly applicable, as the cost and complexity of feature engineering may be reduced relative to supervised techniques, which is not to suggest that at least some embodiments are not also consistent with supervised learning.

In some embodiments, the natural-language processing module 820 may analyze these corpora and store resulting graphs in the graph repository 822, e.g., at query time or in advance, depending on acceptable latency and resources available, or in some cases partially in advance. In some cases, graphs like those described above may be obtained by subjecting a corpus to various types of distributional semantic analysis, e.g., statistical similarities measures like latent semantic analysis, random indexing, normalized Google™ distance, Best path Length On a Semantic Self-Organizing Map, Vector Generation of an Explicitly-defined Multidimensional Semantic Space, or other techniques by which the distribution of terms in documents is represented as relatively high-dimensional vectors, and semantic similarity is measured according to similarity of the vectors, for instance, cosine similarity or Minkowski distance. The analysis technique used by some embodiments may be selected based on the type of relationships to be measured, e.g., between entities or terms, versus between larger units of language, like documents or paragraphs. In some cases, a corpus may be analyzed multiple ways, yielding graphs of relationships between entities mentioned in the documents as well as graphs of relationships between the documents.

Graphs need not be labeled as a "graph" in program code to constitute a graph. Other constructs may be used to the same ends and still constitute a graph. It is enough that the arrangement of information (e.g., in program state, storage, or both) contain the attributes of the presently described graphs to constitute a graph having edges and nodes. For example, in an object-oriented programming environment, documents may be mapped to "document" objects, and those objects may have an attribute of a list of semantically similar documents each of which corresponds to a different "document" object and has a similar list referencing other documents, regardless of whether this arrangement is referred to as a "graph" in code. Similarly, data structures need not be labeled as a "matrix" to constitute a matrix, as such data structures may be encoded as arrays, attributes of objects in an object oriented environment, lists of lists, and the like.

In some embodiments, to measure relationships between documents (or other larger language units, like paragraphs), each document may be represented by a feature vector in which each value of the vector indicates the presence, number of occurrences, or frequency of an n-gram in the document. N-grams are sequences of one or more terms, e.g., "the" is an example of an n-gram where n=1, "the quick" is another n-gram where n=2, and "the quick brown fox jumped" is another where n=5. In some cases, relatively uninformative terms, like stop words ("the," "a," and "an" being common examples), or terms detected with term-frequency inverse document frequency (TF-IDF) scoring may be omitted.

To calculate TF-IDF for a given n-gram, some embodiments may count the number of times the n-gram occurs within a given document and the number of other n-grams in the document before calculating a frequency with which the term occurs within the document. Some embodiments may also count the number of times the n-gram occurs in a larger collection of documents, such as the analyzed corpus of a sampling thereof, as well as the total number of terms in the larger collection of documents to calculate another frequency with which the term appears in the larger collection of documents. The two resulting frequencies may be compared, for instance, dividing one frequency by the other, to determine the TF-IDF score.

Position of a value in the feature vector may correspond to one n-gram, e.g., the first position of a vector may correspond to the n-gram "jumped over," and documents containing this sequence of terms have a feature vector with value in the first position indicating that this term is present. Documents may be analyzed as a whole, or at a higher resolution. For instance, in some embodiments, each document may be partitioned into paragraphs, and then, a feature vector may be constructed for each paragraph, with values of the vector corresponding to the presence of n-grams within the respective paragraph. Vectors need not be labeled as "vectors" in program code to constitute vectors, e.g., ordered lists may constitute a vector in some cases.

Because the universe of n-grams a document could contain is relatively large, and documents tend to use a relatively small portion of these n-grams, feature vectors tend to be relatively high-dimensional and sparse, having a value of zero for most values. To mitigate the burden of high-dimensionality, in some cases, feature vectors may be subjected by some embodiments to various types of dimensional reduction, like indexing, random indexing, or singular value decomposition.

In some cases, a corpus may be represented by arranging the feature vectors into a term-document matrix. For instance, each row or column may correspond to a document, and the values along the row or column may be the feature vector of that document. Thus, rows may represent documents, and columns n-grams, or vice versa.

Or in some embodiments, a document or corpus may be represented as a co-occurrence matrix, where both rows and columns represent n-grams, and values indicate the presence, number, or frequency of instances in which corresponding n-grams occur within a threshold distance of one another in the text. In some embodiments, co-occurrence matrices for documents may be appended to one another to represent a corpus in a higher-dimensional matrix, e.g., in a three dimensional corpus matrix, with each two-dimensional co-occurrence matrix corresponding to a document. Such matrices may be reduced in dimension with a number of techniques, including random indexing. Matrices need not be labeled as a "matrix" in program code to constitute a matrix, e.g., an ordered list of ordered lists may constitute a matrix.

In some cases, a variety of types of relationships may be processed with some embodiments. For instance, semantic similarity or relatedness of entities mentioned in documents, sentiments expressed in documents, or terminology in documents may be determined with computational natural language processing of unstructured plain text corpora. In some embodiments, a corresponding graph may be constructed, with documents, paragraphs, entities, sentiments, or terms as nodes, and weighted edges indicating relationships, like similarity, relatedness, species-genus relationships, synonym relationships, possession relationships, relationships in which one node acts on another node, relationships in which one node is an attribute of another, and the like. In some cases, the edges may be weighted and directed, e.g., where the relationship applies in one direction and can vary in magnitude or certainty.

Analyses of such matrices may entail operations like insertion, multiplication, and addition. As noted above, in some embodiments, matrix operations may be prohibitively slow or memory intensive for a larger dataset. A number of techniques may be used to expedite these operations and reduce memory consumption. In some embodiments, to expedite operations, matrix operations may be performed in a single instance of a computer system, for example, within a single memory address space of a single operating system, and in some cases, by holding some or all of the matrix data in program state concurrently to avoid disk access or network access latency penalties. Or, some embodiments may distribute operations on additional computing systems, which is not to imply that any other feature described herein may not also be omitted. In some embodiments, the computer system may be configured with a relatively large amount of random access memory and on-chip cash memory to these ends.

In some cases, some of the sparse-matrices described above may consume a relatively large amount of memory using some traditional techniques. To conserve memory, some embodiments may compress the sparse matrices, for example, by decomposing a matrix into vectors, and translating the vectors into an index indicating which vector scalars have a nonzero value and corresponding indications of those values. Some embodiments may compress such vectors with run-length coding of values of those values that are zero. Some examples may compress sparse matrices as a dictionary of key, a list of lists, a coordinate list, a compressed sparse row, or a compressed sparse column. In some cases, such matrices, or portions of sparse matrices, may be expanded for some vector operations and then re-compressed after and before, respectively, the sparse matrices, or portions thereof, are moved upward in a memory hierarchy towards a processor.

Various encodings may be selected to improve the functioning of a computer system. In some cases, values of matrices, like weights, may be normalized, for example, ranging between zero and one or as 8, 16, or 32 bit binary values having a number of digits selected in view of an operating system, register size, memory bust size, and other hardware constraints of a computer system upon which the above processes are to be run to expedite operations and conserve memory.

Some embodiments may determine document similarity based on latent semantic analysis of unstructured text in the documents. For instance, some embodiments may create a term document matrix of the documents. Then, the term-document matrix may be transformed with singular value decomposition (SVD) to map documents to concepts expressed by the terms. Documents having similar concepts may be deemed similar, e.g., based on similarity of concept vectors for the documents yielded by SVD. In some cases, terms appearing with more than a threshold frequency in the documents may be determined and weighted according to TF-IDF. In some cases, the resulting weighted term document matrix may be decomposed by determining two vectors, that when multiplied, approximate the matrix. In some embodiments, error between the approximation and the matrix may be determined, and the error may be decomposed by determining two more vectors that when multiplied approximate the matrix of errors. This process may be repeated until an aggregate error is determined to be smaller than a threshold. A threshold number (e.g., the second and third) of the resulting vectors may correspond to dimensions in a concept space, where the concepts that emerge correspond to co-occurrence of terms in documents indicated by clusters in the space. Documents may be clustered according to their corresponding vectors in the concept space, or similarity of documents may be determined by some embodiments by comparing their respective vectors in this space, e.g., based on cosine similarity or other measures.

In some cases, high dimensional sparse vectors may be reduced in dimension with random indexing. For instance, document text may be represented in a co-occurrence matrix, where rows represent n-grams, columns represent adjacent n-grams (like within a threshold number of words in the text), or vice versa, and values represent presence, number, or frequency of instances in which corresponding terms are determined to be adjacent one another in the text. In some cases, to reduce memory consumption of sparse vectors in such a semantic similarity analysis, a co-occurrence matrix may be created by representing adjacent n-grams as vectors that are smaller (e.g., substantially smaller) than the number of potential adjacent n-grams and are made generally distinguishable from one another by randomly (e.g., pseudo-randomly) assigning values, like 0, +1, or −1. As adjacent n-grams are encountered during parsing, corresponding rows or columns of n-grams in the co-occurrence matrix may be updated by summing current values of the row or column with corresponding values of the adjacent n-gram vector. Similarity of n-grams (and corresponding entities) may be determined based on similarity of resulting vectors in the co-occurrence matrix, e.g., based on cosine similarity.

In some cases, similarity (or other relationships) between larger language units may be determined. For instance, in some cases, a feature vector may be determined for documents in a corpus. Some embodiments may execute a density-based clustering algorithm, like DBSCAN, to establish groups corresponding to the resulting clusters and exclude outliers. To cluster according to vectors, some embodiments may iterate through each of the vectors reflected in the records and designate a vector as a core location in vector space if at least a threshold number of the other vectors in the records are within a threshold distance in vector space. Some embodiments may then iterate through each of the vectors and create a graph of reachable vectors, where nodes on the graph are identified in response to non-core corresponding vectors being within a threshold distance of a core vector in the graph, and in response to core vectors in the graph being reachable by other core vectors in the graph, where two vectors are reachable from one another if there is a path from one vector to the other vector where every link and the path is a core vector and is within a threshold distance of one another. The set of nodes in each resulting graph, in some embodiments, may be designated as a cluster, and points excluded from the graphs may be designated as outliers that do not correspond to clusters.

In some cases, when performing these operations, movements within a memory hierarchy of a computer system (e.g., from storage, to dynamic random access memory, to L3 cache, to L2 cache, to processor registers) may be relatively slow, and memory space may be particularly limited higher in the hierarchy, closer to the processor. For example, access to data stored in registers of a processor, such as a CPU or graphics processing unit, may be relatively fast, while the amount of available storage may be relatively low. Level 2 and level 3 cache, respectively, may offer trade-offs of increasing magnitude, exchanging slower access times for greater storage space. Similarly, dynamic random access memory may offer even greater storage, though access times may be several orders of magnitude slower than the registers or cache memory, and persistent system storage, such as a hard disk or solid-state drive) may extend this trade-off even further. In some embodiments, matrices may be large enough that during operation substantial portions of the matrix, for example, most of the matrix, cannot fit into the higher levels of a memory hierarchy, and portions of the matrix may be swapped in and out of the higher levels of memory hierarchy during operations on those portions. As a result, in some embodiments, movement of data between levels of the memory hierarchy may account for a substantial portion of the computing resources, e.g., time and memory, consumed by a matrix operation. As some use cases reach relatively large scales, this consumption of computing resources may become prohibitive.

In some embodiments, a blocking algorithm may be executed during certain matrix operations, for example, when multiplying two dense matrices or a dense matrix by a sparse matrix, to improve the functioning of the computer system and reduce the amount of time spent shifting data back and forth between levels of a memory hierarchy. In some embodiments, upon initiating a matrix multiplication, one or both of the matrices may be subdivided into blocks (e.g., tiles), each having a plurality of contiguous values within the respective matrix within a plurality of a sequence of rows and columns, for instance, those values that are both in the first 8 columns and in the first 8 rows might constitute one tile. In some embodiments, tile size may be selected based on the amount of available memory at various levels of a memory hierarchy, such that a given tile can fit within a targeted level of the hierarchy, like the level 2 or level 3 cache. Next, some embodiments may iterate through the tiles, loading the tiles into a higher level of the memory hierarchy, and then performing operations with that tile. In some embodiments, a given tile, after being loaded into the higher level of the memory hierarchy, may be applied to update each implicated value of a product matrix. In some cases, the values of the product matrix may be initially set to zero, and then those values may accumulate updates as tiles are loaded and processed, until all of the tiles have been processed, and the final value of the resultant matrix is known. In some cases, updating a given value may include summing an existing value with one or more products of values within a tile that has been loaded into the higher level of the memory hierarchy. References to higher and lower levels of memory hierarchy, rather than specific levels, are intended to indicate the applicability of this approach to different levels of the hierarchy, for example, the higher and lower levels may be level 2 cache and dynamic random access memory respectively or level 2 cache and level 3 cache respectively. In some cases, multiple levels of tiling may be performed, e.g., a tile loaded into cache may be sub-divided into register-sized sub-tiles. In some cases, some of the techniques for accelerating matrix or vector operations or conserving memory may be implemented by invoking appropriate sequences of commands in a basic linear algebra subroutine library, like level 1, 2, or 3 commands.

In some embodiments, the data visualization module 824 may be operative to prepare data visualizations for display on user devices, e.g., visualizations of the graphs described herein. In some cases, such visualizations may include physics-based arrangements of nodes within a display, like a force-directed layout. In some cases, graph generation and visualization preparation takes place on computational linguistics system 802, and resulting interactive visualizations run (e.g., entirely) in a web browser of a user device. In some cases, this entails displaying and manipulating thousands of vertices and edges in an environment on user devices not known for speed. At the same time, in some use cases, users desire a relatively large amount of data on display, while keeping a responsive frame rate. To increase frame rate, some embodiments may use various techniques to optimize the network visualization and make the computer system run faster, including invoking WebGL commands to enlist a user's GPU in rendering a web page and pre-processing.

Graphs of real-world information are often relatively intricate. In some embodiments, visualizations may support real-time (e.g., in this context, with less than 500 ms latency) interactions with relatively large numbers of interactive objects, e.g., more than 500, like more than 1,000, and in some cases as many as 20,000 interactive objects with near zero latency. In some embodiments, this speed is accomplished by pre-processing physics models of graph layouts with graphical processing units (GPUs) of the computational linguistics system 802, to reduce the computational burden on less powerful CPUs executing browsers on user devices. In some cases, displays may be relatively high dimensional, e.g., various visual attributes, like line weight, icon size, color, transparency, drop shadow offsets, or properties of physical models, like inertia, friction, attractive forces, repulsive forces, momentum, frequency of oscillation, and the like, may be mapped to different dimensions like those discussed above, e.g., similarity, relatedness, sentiment, and the like. Connections tend to be more relatively complicated and irregular, and embodiments often do not determine the visual shape of the graph ahead of time. Indeed, graph isomorphism provides for a relatively large number of visual arrangements of otherwise identical graphs, but many arrangements are relatively un-informative and difficult to visually parse to a human user consuming the resultant data.

To visualize graph relations, some embodiments of data visualization module 824 may arrange vertices (also referred to as nodes) and edges using a physics simulation that mimics the stretching of spider webs. Some spider-web-inspired representations may model interactions between each pair of vertices as a Coulomb-like repulsion and an additional Hooke-like attraction in the presence of an edge between the pair. A relatively weak gravitation-like force may be modeled to prevent separate components and isolated vertices from venturing too far from the network's center of mass. Thus, some embodiments may use this physics-based network layout. In some cases, the parameters and initial conditions of the physics based model may be determined by data visualization module 824, and instructions for executing the model and adjusting the model based on user input may be sent to the user device, e.g., in the form of JavaScript™ instructions for that model, for instance, a user selecting and dragging a node as a force applied to the physics model. Embodiments are expected to appear relatively natural, and the hierarchy of a network's structure is expected to be readily apparent; both small and large network structures are exposed, which is expected to allow users to study relationships between groups of vertices on different scales.

Running a physics simulation in a user's browser can easily exceed the available computing resources, as the simulation can be inherently resource-intensive for larger, highly connected data sets. To mitigate this issue, some embodiments may exploit phenomena expected to arise as the size of the data scales. It is expected that, in some embodiments, the number of time steps consumed to achieve equilibrium starting with a random configuration of vertices scales linearly with the number of vertices. That is undesirable for presentation purposes (though some embodiments are consistent with this approach, particularly for smaller data sets). To mitigate this, some embodiments may arrange for initial conditions of the simulation so the equilibrium is attained faster.

To select initial conditions of the physics-based animation of this n-body system, some embodiments may perform a gradient descent optimization. Some embodiments may compute the gradient of the modeled system's energy (e.g., based on the forces affecting nodes), integrate that to compute momentum, and move the particles in the simulation representing nodes accordingly. Initial conditions of the gradient descent may be selected strategically in some cases to mitigate the effects of local minima in what is expected to be a relatively rough energy landscape (though embodiments are also consistent with random selection of initial conditions, like with a stochastic gradient descent). For instance, some embodiments may seed the simulation with a vertex configuration that is in the vicinity of the final destination. To this end, some embodiments may execute a discretized version of the problem and search through all vertex configurations on a 2D grid.

This process is still of combinatorial complexity, however, and may generally be too expensive for some larger graphs. To mitigate this issue further, some embodiments may simplify the search space to one dimension with space filling curves, like a z-curve or Hilbert curve that covers a 2D region of space with a one-dimensional curve. Such space-filling curves may be constructed via an iterative process, whereby at each step of the iteration the curve is refined at ever-finer scales. By ceasing iterations at a finite step, some embodiments may obtain a curve with just enough points to accommodate the data at issue. Further benefits, in some embodiments, may arise from the property of some space-filling curves: the 2D distance between any pair of vertices is well-approximated by (the square root of) the distance along the curve. In this scenario, in some embodiments, the problem of finding an approximate 2D layout is equivalent to finding an energy-optimal linear ordering of vertices, which some embodiments may use to implement less computationally intensive heuristics, circumventing the initial combinatorial complexity. That said, not all embodiments provide this benefit, as the various inventions described herein are independently useful.

Figure 5:
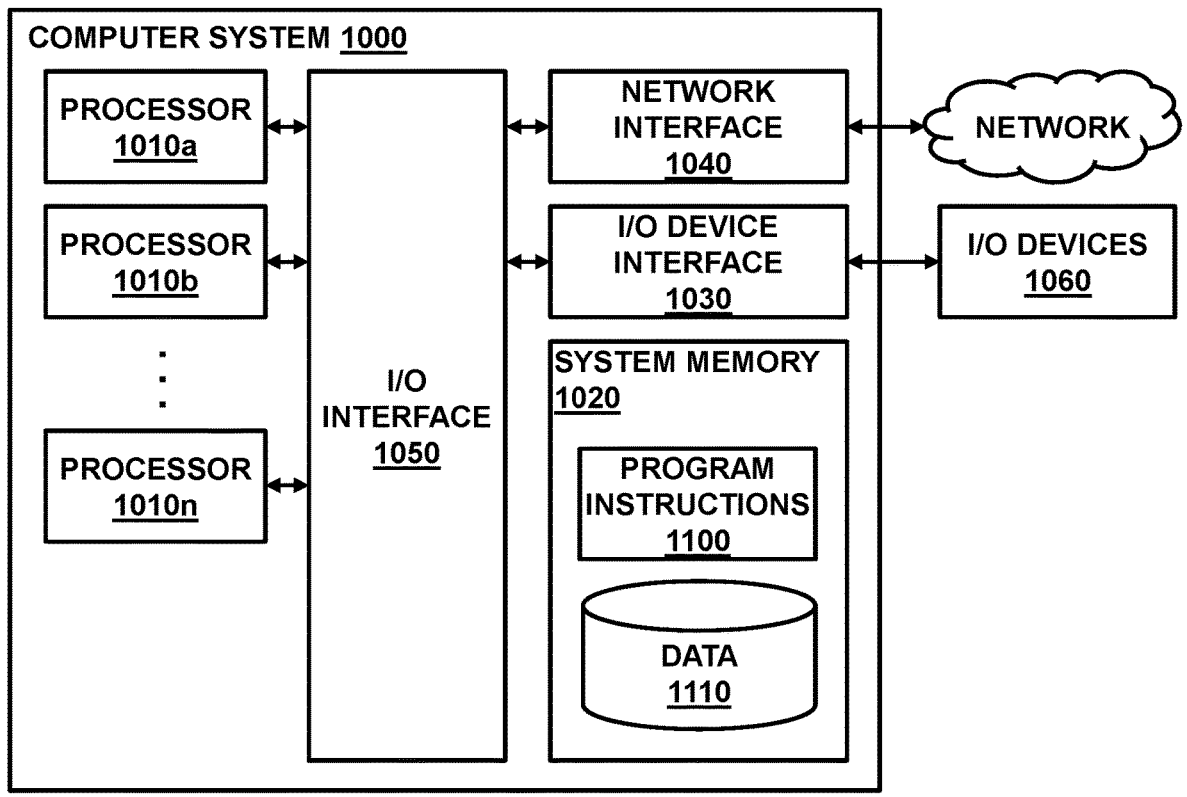
FIG. 5 is a block diagram of an example of a computer system by which the above-techniques may be implemented.

FIG. 5 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Program instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times, e.g., a copy may be created by writing program code to a first-in-first-out buffer in a network interface, where some of the instructions are pushed out of the buffer before other portions of the instructions are written to the buffer, with all of the instructions residing in memory on the buffer, just not all at the same time.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present invention may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several inventions. Rather than separating those inventions into multiple isolated patent applications, applicants have grouped these inventions into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to cost constraints, some inventions disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such inventions or all aspects of such inventions.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses all such attributes or functions being mapped to all such objects and subsets of the attributes or functions being mapped to subsets of the attributes or functions (e.g., all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, any such conflicting text in such incorporated by reference U.S. patents, U.S. patent applications, and other materials is specifically not incorporated by reference in this patent.

The present techniques will be better understood with reference to the following enumerated embodiments:

1. A method of pivoting from a graph of semantic similarity of documents to a derivative graph of relationships between entities mentioned in the documents, the method comprising: obtaining a first graph comprising more than 1000 nodes and more than 2000 edges, each of the first-graph edges linking two of the first-graph nodes and denoting semantic similarity of unstructured text in documents corresponding to the two linked first-graph nodes, and the first graph being generated from natural language processing of a corpus of unstructured text documents; detecting, by one or more processors, more than 100 entities mentioned in the unstructured text documents, the entities each corresponding to respective nodes in a second graph to be derived from the first graph; and for each pair of the second-graph nodes, determining, by one or more processors, a respective edge weight indicating similarity between a first entity corresponding to a first node of the respective pair and a second entity corresponding to a second node of the respective pair, wherein determining the respective edge weight comprises: determining a source node of the first graph having an unstructured text document in which the first entity is mentioned; sampling nodes of the first graph based on edges of the first graph; determining which, if any, of the sampled nodes are destination nodes having an unstructured text document in which the second entity is mentioned based on the determination of which of the sampled nodes are destination nodes, determining an entity-similarity score indicating an amount of similarity between the first entity and the second entity; and determining the respective edge weight based on the attribute-similarity value.

2. The method of embodiment 1, wherein: the documents have on average more than 50 words; at least some of the entities are people or businesses mentioned in the documents; obtaining the first graph comprises: obtaining the unstructured text documents; determining, for each document, a feature vector indicating the presence of n-grams in the respective document; determining pair-wise similarity scores based on a respective angle between the respective feature vectors; detecting more than 100 entities mentioned in the unstructured text documents comprises detecting more than 1000 entities with means for named-entity recognition; determining a source node of the first graph having an unstructured text document in which the first entity is mentioned comprises: identifying a set of a plurality of nodes in the first graph having an unstructured text document in which the first entity is mentioned; and selecting the source node from among the set; and the respective edge weight is based on probabilistic walks through the first graph from a plurality of source nodes among the first set;

3. The method of any of embodiments 1-2, wherein the entity-similarity score monotonically increases as the amount of destination nodes increases.

4. The method of any of embodiments 1-3, wherein the entity-similarity score is based on a ratio of an amount of nodes sampled and an amount of the sampled nodes determined to be destination nodes.

5. The method of any of embodiments 1-4, wherein the entity-similarity score is based on a cardinality of entities mentioned in at least some of the documents.

6. The method of any of embodiments 1-5, wherein the entity-similarity score is based on an amount of entities mentioned in unstructured document text of at least one of the destination nodes.

7. The method of any of embodiments 1-6, wherein sampling nodes of the first graph based on edges of the first graph comprises: determining which nodes in the first graph are adjacent the source node; and selecting among the adjacent nodes.

8. The method of embodiment 7, wherein selecting among the adjacent nodes comprises: selecting among the adjacent nodes of the first graph based on a respective edge weight between the source node and the respective adjacent node.

9. The method of embodiment 7, comprising: determining which nodes in the first graph are adjacent the selected adjacent node; and selecting among the nodes adjacent the node adjacent the source node in the first graph.

10. The method of any of embodiments 1-9, wherein determining a respective edge weight indicating similarity between a first entity and a second entity comprises: probabilistically traversing the first graph from the source node to a plurality of nodes via edges of the first graph; determining an amount of the plurality of nodes that mention the second entity; determining a sample statistic of the plurality of nodes based on the amount.

11. The method of any of embodiments 1-10, comprising: for each of the second-graph nodes, assessing, by one or more processors, the number of edges of the second-graph node, wherein assessing the number of edges comprises, with respect to each adjacent node in the second graph sharing an edge with the second-graph node: determining whether the respective edge weight of the shared edge satisfies a threshold score for maintaining an edge; and removing the shared edge in response to the respective edge weight not satisfying the threshold score.

12. The method of any of embodiments 1-11, wherein sampling a node of the first graph comprises performing steps for sampling a node of the first graph from one or more nodes proximate the source node.

13. The method of any of embodiments 1-12, wherein sampling a node of the first graph comprises randomly selecting a node of the first graph from one or more nodes adjacent the source node.

14. The method of any of embodiments 1-13, wherein determining the entity-similarity value comprises performing steps for determining an attribute-similarity value.

15. The method of any of embodiments 1-14, wherein determining the entity-similarity value comprises: determining a probability of traversing the first graph from the source node to a destination node within less than a threshold amount of hops; and determining the attribute-similarity value based on the related probability.

16. The method of embodiment 15, wherein determining the related probability comprises: in response to no edge or combination of edges linking the source node to a destination node, determining the related probability to be zero.

17. The method of embodiment 15, wherein determining the related probability comprises: in response to an edge or combination of edges linking the source node to a set of destination nodes, determining the related probability based on the weights of the edge or combination of edges linking the source node to the destination nodes.

18. The system of claim 15, wherein determining the related probability comprises: in response to edges linking the source node to destination nodes, normalizing edge weights of the edges and determining the related probability based on the normalized edge weights.

19. The method of any of embodiments 1-18, further comprising: for each of the evaluation nodes of the first graph, extracting the attributes from a plurality of metadata attributes of documents corresponding to one or more of the first-graph nodes or based on information external to the corpus from which the first graph was generated, wherein the second-graph nodes are selected to respectively represent the extracted attributes.

20. A tangible, non-transitory, machine-readable medium storing instructions that when executed by a data processing apparatus cause the data processing apparatus to perform operations comprising those of any of embodiments 1-19.

21. A system, comprising: one or more processors; and memory storing instructions that when executed by the processors cause the processors to effectuate operations comprising those of any of embodiments 1-19.

What is claimed is:

1. A tangible, non-transitory, machine-readable media storing instructions that, when executed by one or more processors, effectuate operations comprising:
    obtaining, with one or more processors, a set of natural language text documents and a set of document-relationships between the documents;
    obtaining, with one or more processors, a set of entities comprising entities mentioned in the documents;
    inferring, with one or more processors, entity-relationships between the entities based on the document-relationships of the documents mentioning the respective entities, wherein:
        inferring the entity-relationships comprises sampling document-relationships without exhaustively evaluating every document relationship to identify document-relationships between pairs of documents that mention pairs of entities, wherein at least some of the pairs of documents comprise documents that mention one but not both of a respective pair of entities; and
    storing, with one or more processors, the inferred entity-relationships in memory.

2. The media of claim 1 wherein:
    obtaining the set of document-relationships comprises obtaining a first graph comprising nodes corresponding to text in the documents and edges connecting respective pairs of the nodes, the edges indicating relationships between the nodes of the first graph; and
    inferring the entity-relationships comprises:
        sampling the nodes of the first graph to sample document-relationships;
        forming a second graph comprising nodes and edges, each of at least some of the nodes of the second graph corresponding to at least one entity among the set of entities;
        wherein forming the second graph comprises, for pairs of the nodes of the second graph, setting a relationship between the respective pair of nodes, the respective pairs of nodes comprising (i) a first node corresponding to a first entity and (ii) a second node corresponding to a second entity;
        wherein setting the relationship between the respective pair of nodes comprises:
            identifying, in the first graph, a node in response to determining that the node corresponds to an unstructured text document in which the first entity is mentioned;
            determining whether or which of the sampled nodes comprise a node that satisfies a set of criteria, the set of criteria comprising (i) having a relationship with the identified node and (ii) corresponding to an unstructured text document in which the second entity is mentioned; and
            setting the relationship between the respective pair of nodes based on the determination of whether or which of the sampled nodes comprises a node that satisfies the set of criteria.

3. The media of claim 2, wherein:
    the natural language text documents comprises more than 1,000 unstructured text documents having on average more than 50 words per document;
    at least some of entities mentioned in the unstructured text documents are people or businesses mentioned in the unstructured text documents;
    each of the unstructured text documents, on average, mentions three or more entities; and
    each entity, on average, is mentioned in two or more of the unstructured text documents.

4. The media of claim 2, wherein obtaining the set of document-relationships between the documents comprises:
    obtaining unstructured natural language text documents;
    determining, for each of the unstructured natural language text documents, a feature vector indicating the presence of n-grams in the document;
    determining pair-wise similarity scores based on a respective angle between the respective feature vectors; and
    setting relationships of nodes of a document-relationship graph based on the pair-wise similarity scores.

5. The media of claim 4, wherein inferring the entity-relationships comprises:
    identifying, in the document-relationship graph, a node that corresponds to an unstructured natural language text document in which a first entity is mentioned by performing operations comprising:
        identifying a plurality of nodes in the first graph that each corresponds to an unstructured natural language text document in which the first entity is mentioned; and
        selecting the identified node from among the plurality of nodes.

6. The media of claim 2, wherein inferring the entity-relationships comprises:
    setting the entity-relationships between a pair of entities such that a value of the relationship between the pair of entities monotonically increases as an amount of documents both having document-relationships and mentioning at least one of the pair of entities increases.

7. The media of claim 2, wherein inferring the entity-relationships comprises:
    setting the entity-relationship between a pair of entities based on a ratio of an amount of the documents that are sampled and an amount of the sampled nodes determined to satisfy the set of criteria based on mentions of at least some of the pair of entities.

8. The media of claim 2, wherein setting the relationship between the pair of nodes comprises:
    setting the relationship between the pair of nodes based on an amount of entities mentioned in unstructured document text of at least one of the sample nodes that satisfy the set of criteria.

9. The media of claim 2, wherein sampling the nodes of the first graph comprises:
    determining which of the nodes of the first graph are adjacent the identified node; and selecting among the adjacent nodes to obtain the sampled nodes.

10. The media of claim 9, wherein selecting among the adjacent nodes comprises:
selecting among the adjacent nodes of the first graph based on a respective edge weight between the source node and the respective adjacent node.

11. The media of claim 9, the operations comprising:
determining which nodes in the first graph are adjacent the selected adjacent node; and
selecting among the nodes adjacent the node adjacent the source node in the first graph.

12. The media of claim 2, wherein sampling nodes of the first graph comprises probabilistically traversing the first graph from the identified node to a plurality of nodes via edges of the first graph, and
wherein setting the relationship between the pair of nodes comprises:
determining an amount of the plurality of nodes that mention the second entity;
determining a sample statistic of the plurality of nodes based on the amount; and
setting the relationship between the pair of nodes based on the sample statistic.

13. The media of claim 2, wherein sampling nodes of the first graph comprises performing steps for sampling a node of the first graph from one or more nodes proximate the identified node.

14. The media of claim 2, wherein sampling nodes of the first graph comprises randomly selecting a node of the first graph from one or more nodes adjacent the identified node.

15. The media of claim 1, the operations comprising:
performing steps for clustering an entity graph; and
performing steps for causing the entity graph to be displayed.

16. The media of claim 1, wherein:
the document-relationships are semantic similarity relationships determined based on distributional semantic analysis of the natural language text documents; and
entity relationships are inferred based on entities being mentioned in documents that are indicated to be semantically similar in the document-relationships.

17. The media of claim 1, wherein:
inferring the entity-relationships comprises determining probabilities of traversing the document-relationships from a document mentioning a first entity to a document mentioning a second entity in a pair of entities to which a given entity-relationship pertains.

18. The media of claim 1, wherein:
inferring the entity-relationships comprises, for a given entity-relationship between a first entity and a second entity:
selecting a source document that mentions the first entity;
selecting a first subset of documents having a document-relationship with the source document in the document-relationships; and
determining the given entity-relationship based on determining that a second document among the first subset of documents is a destination document that mentions the second entity.

19. The media of claim 18, wherein inferring the entity-relationships comprises:
selecting a second subset of documents having a document-relationship with the second document in the document-relationships; and
determining the given entity-relationship based on determining that a third document among the second subset of documents is a destination document that mentions the second entity.

20. A method comprising:
obtaining, with one or more processors, a set of natural language text documents and a set of document-relationships between the documents;
obtaining, with one or more processors, a set of entities comprising entities mentioned in the documents;
inferring, with one or more processors, entity-relationships between the entities based on the document-relationships of the documents mentioning the respective entities, wherein:
inferring the entity-relationships comprises sampling document-relationships without exhaustively evaluating every document relationship to identify document-relationships between pairs of documents that mention pairs of entities, wherein at least some of the pairs of documents comprise documents that mention one but not both of a respective pair of entities; and
storing, with one or more processors, the inferred entity-relationships in memory.

* * * * *